US011471865B2

(12) United States Patent
Tait et al.

(10) Patent No.: US 11,471,865 B2
(45) Date of Patent: Oct. 18, 2022

(54) SYNTHESIS OF PLATINUM SINGLE-SITE CENTERS THROUGH METAL-LIGAND SELF-ASSEMBLY ON METAL OXIDE SUPPORTS

(71) Applicant: THE TRUSTEES OF INDIANA UNIVERSITY, Bloomington, IN (US)

(72) Inventors: Steven L. Tait, Bloomington, IN (US); Linxiao Chen, Issaquah, WA (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 273 days.

(21) Appl. No.: 16/717,069

(22) Filed: Dec. 17, 2019

(65) Prior Publication Data

US 2020/0261896 A1 Aug. 20, 2020

Related U.S. Application Data

(60) Provisional application No. 62/780,593, filed on Dec. 17, 2018.

(51) Int. Cl.
| | |
|---|---|
| *B01J 31/12* | (2006.01) |
| *B01J 37/04* | (2006.01) |
| *B01J 6/00* | (2006.01) |
| *B01J 37/00* | (2006.01) |
| *B01J 37/06* | (2006.01) |
| *B01J 23/10* | (2006.01) |

(52) U.S. Cl.
CPC ............... *B01J 31/12* (2013.01); *B01J 6/001* (2013.01); *B01J 37/0027* (2013.01); *B01J 37/04* (2013.01); *B01J 37/06* (2013.01); *B01J 23/10* (2013.01)

(58) Field of Classification Search
CPC ........ B01J 31/12; B01J 6/001; B01J 37/0027; B01J 37/04; B01J 37/06; B01J 23/10; B01J 2231/323; B01J 2531/0216; B01J 2531/828; B01J 31/1815; B01J 21/04; B01J 21/10; B01J 37/0209; B01J 23/42
See application file for complete search history.

(56) References Cited

PUBLICATIONS

Chen et al (Synthesis of platinum single-site centers through metal-ligand self-assembly on powdered metal oxide supports, Journal of Catalysis, Jul. 21, 2018). (Year: 2018).*
Z. Huang, X. Gu, Q. Cao, P. Hu, J. Hao, J. Li, X. Tang, Catalytically Active Single-Atom Sites Fabricated from Silver Particles, Angew. Chem., 124 (2012) 4274-4279.
E. Fako, Z. Lodziana, N. Lopez, Comparative single atom heterogeneous catalysts (SAHCs) on different platforms: a theoretical approach, Catal. Sci. Tech., 7 (2017) 4285-4293.
Y.X. Chen, Z.W. Huang, Z. Ma, J.M. Chen, X.F. Tang, Fabrication, characterization, and stability of supported single-atom catalysts, Catal. Sci. Tech., 7 (2017) 4250-4258.

(Continued)

*Primary Examiner* — Anthony J Zimmer
*Assistant Examiner* — Logan Edward Laclair
(74) *Attorney, Agent, or Firm* — Barnes & Thornburg LLP; Scott Rothenberger

(57) ABSTRACT

The invention describes single-site metal catalysts such as Pt single-site centers with a 3,6-di-2-pyridyl-1,2,4,5-tetrazine (DPTZ) ligand on support such as a powdered MgO, $Al_2O_3$, $CeO_2$ or mixtures thereof.

4 Claims, 13 Drawing Sheets

(56) References Cited

PUBLICATIONS

B. Qiao, A. Wang, X. Yang, L.F. Allard, Z. Jiang, Y. Cui, J. Liu, J. Li, T. Zhang, Single-atom catalysis of CO oxidation using Pt1/FeOx, Nature Chem., 3 (2011) 634-641.

H. Sohn, J. Camacho-Bunquin, R.R. Langeslay, P.A. Ignacio-de Leon, J. Niklas, O.G. Poluektov, C. Liu, J.G. Connell, D. Yang, J. Kropf, H. Kim, P.C. Stair, M. Ferrandon, M. Delferro, Isolated, well-defined organovanadium(III) on silica: single-site catalyst for hydrogenation of alkenes and alkynes, Chem. Comm., 53 (2017) 7325-7328.

C.A. Demmelmaier, R.E. White, J.A. van Bokhoven, S.L. Scott, Nature of ≡SiOCrO2CI and (≡SiO)2CrO2 Sites Prepared by Grafting CrO2Cl2 onto Silica, J. Phys. Chem. C, 112 (2008) 6439-6449.

C. Tiozzo, C. Bisio, F. Carniato, A. Gallo, S.L. Scott, R. Psaro, M. Guidotti, Niobium-silica catalysts for the selective epoxidation of cyclic alkenes: the generation of the active site by grafting niobocene dichloride, Phys. Chem. Chem. Phys., 15 (2013) 13354-13362.

L. Zhong, M.-Y. Lee, Z. Liu, Y.-J. Wanglee, B. Liu, S.L. Scott, Spectroscopic and structural characterization of Cr(II)/SiO2 active site precursors in model Phillips polymerization catalysts, J. Catal., 293 (2012) 1-12.

M.D. Marcinkowski, J. Liu, C.J. Murphy, M.L. Liriano, N.A. Wasio, F.R. Lucci, M. Flytzani-Stephanopoulos, E.C.H. Sykes, Selective formic acid dehydrogenation on Pt—Cu single-atom alloys, ACS Catal., 7 (2016) 413-420.

F.R. Lucci, J. Liu, M.D. Marcinkowski, M. Yang, L.F. Allard, M. Flytzani-Stephanopoulos, E.C.H. Sykes, Selective hydrogenation of 1, 3-butadiene on platinum-copper alloys at the single-atom limit. Nature Comm., 6 (2015) 8550.

P. Liu, Y. Zhao, R. Qin, S. Mo, G. Chen, L. Gu, D.M. Chevrier, P. Zhang, Q. Guo, D. Zang, Photochemical route for synthesizing atomically dispersed palladium catalysts, Science, 352 (2016) 797-800.

L. Chen, S. Rangan, J. Li, H. Jiang, Y. Li, A molecular Pd (II) complex incorporated into a MOF as a highly active single-site heterogeneous catalyst for C—Cl bond activation, Green Chem., 16 (2014) 3978-3985.

Z. Novotný, G. Argentero, Z. Wang, M. Schmid, U. Diebold, G.S. Parkinson, Ordered array of single adatoms with remarkable thermal stability: Au/Fe3O4 (001), Phys. Rev. Lett., 108 (2012) 216103.

D. Skomski, C.D. Tempas, K.A. Smith, S.L. Tait, Redox-Active On-Surface Assembly of Metal-Organic Chains with Single-Site Pt(II), J. Am. Chem. Soc., 136 (2014) 9862-9865.

B. Hu, A.B. Getsoian, N.M. Schweitzer, U. Das, H. Kim, J. Nildas, O. Poluektov, L.A. Curtiss, P.C. Stair, J.T. Miller, A. S. Hock, Selective propane dehydrogenation with single-site Co-II on SiO2 by a non-redox mechanism, J. Catal., 322 (2015) 24-37.

A. Corma, O.G. Salnikov, D.A. Barskiy, K.V. Kovtunov, I.V. Koptyug, Single-Atom Gold Catalysis in the Context of Developments in Parahydrogen-Induced Polarization, Chem. Eur. J., 21 (2015) 7012-7015.

H. Yan, H. Cheng, H. Yi, Y. Lin, T. Yao, C. Wang, J. Li, S. Wei, J. Lu, Single-atom Pd1/graphene catalyst achieved by atomic layer deposition: remarkable performance in selective hydrogenation of 1, 3-butadiene, J. Am. Chem. Soc., 137 (2015) 10484-10487.

Q. Fu, H. Saltsburg, M. Flytzani-Stephanopoulos, Active nonmetallic Au and Pt species on ceria-based water-gas shift catalysts, Science, 301 (2003) 935-938.

E.J. Peterson, A.T. DeLaRiva, S. Lin, R.S. Johnson, H. Guo, J.T. Miller, J.H. Kwak, C.H. Peden, B. Kiefer, L.F. Allard, Low-temperature carbon monoxide oxidation catalysed by regenerable atomically dispersed palladium on alumina, Nature Comm., 5 (2014) 4885.

M. Moses-DeBusk, M. Yoon, L.F. Allard, D.R. Mullins, Z. Wu, X. Yang, G. Veith, G.M. Stocks, C.K. Narula, CO oxidation on supported single Pt atoms: Experimental and ab initio density functional studies of CO interaction with Pt atom on θ-Al2O3 (010) surface, J. Am. Chem. Soc., 135 (2013) 12634-12645.

J. Jones, H. Xiong, A.T. DeLaRiva, E.J. Peterson, H. Pham, S.R. Challa, G. Qi, S. Oh, M.H. Wiebenga, X.I.P. Hernández, Thermally stable single-atom platinum-on-ceria catalysts via atom trapping, Science, 353 (2016) 150-154.

G. Kyriakou, M.B. Boucher, A.D. Jewell, E.A. Lewis, T.J. Lawton, A.E. Baber, H.L. Tierney, M. Flytzani-Stephanopoulos, E.H. Sykes, Isolated metal atom geometries as a strategy for selective heterogeneous hydrogenations, Science, 335 (2012) 1209-1212.

G.X. Pei, X.Y. Liu, X. Yang, L. Zhang, A. Wang, L. Li, H. Wang, X. Wang, T. Zhang, Performance of Cu-Alloyed Pd Single-Atom Catalyst for Semihydrogenation of Acetylene under Simulated Front-End Conditions, ACS Catal., 7 (2017) 1491-1500.

J. Liu, F.R. Lucci, M. Yang, S. Lee, M.D. Marcinkowski, A.J. Therrien, C.T. Williams, E.C.H. Sykes, M. Flytzani-Stephanopoulos, Tackling CO Poisoning with Single-Atom Alloy Catalysts, J. Am. Chem. Soc., 138 (2016) 6396-6399.

D. Ma, T. Li, Q. Wang, G. Yang, C. He, B. Ma, Z. Lu, Graphyne as a promising substrate for the noble-metal single-atom catalysts, Carbon, 95 (2015) 756-765.

G. Vilé, D. Albani, M. Nachtegaal, Z. Chen, D. Dontsova, M. Antonietti, N. López, J. Pérez-Ramírez, a Stable Single-Site Palladium Catalyst for Hydrogenations, Angew. Chem. Int. Ed., 54 (2015) 11265-11269.

X. Li, W. Zhong, P. Cui, J. Li, J. Jiang, Design of efficient catalysts with double transition metal atoms on C2N layer, J. Phys. Chem. Lett., 7 (2016) 1750-1755.

M. Joglekar, V. Nguyen, S. Pylypenko, C. Ngo, Q. Li, M.E. O'Reilly, T.S. Gray, W.A. Hubbard, T.B. Gunnoe, A.M. Herring, Organometallic complexes anchored to conductive carbon for electrocatalytic oxidation of methane at low temperature, J. Am. Chem. Soc., 138 (2015) 116-125.

A. Liu, L. Yang, C.-H. Traulsen, J. Cornelissen, Immobilization of catalytic virus-like particles in a flow reactor, Chem. Comm., 53 (2017) 7632-7634.

W. Xu, Y. Li, B. Yu, J. Yang, Y. Zhang, X. Chen, G. Zhang, Z. Gao, Ligand-tailored single-site silica supported titanium catalysts: Synthesis, characterization and towards cyanosilylation reaction, J. Solid State Chem., 221 (2015) 208-215.

W. Xu, B. Yu, Y. Zhang, X. Chen, G. Zhang, Z. Gao, Single-site SBA-15 supported zirconium catalysts. Synthesis, characterization and toward cyanosilylation reaction, Appl. Surf. Sci., 325 (2015) 227-234.

K.M. Mantovani, J.F. Stival, F. Wypych, L. Bach, P.G.P. Zamora, M.L. Rocco, S. Nakagaki, Unusual catalytic activity after simultaneous immobilization of two metalloporphyrins on hydrozincite/nanocrystalline anatase, J. Catal., 352 (2017) 442-451.

S. Hübner, J.G. de Vries, V. Farina, Why Does Industry Not Use Immobilized Transition Metal Complexes as Catalysts?, Adv. Synth. Catal., 358 (2016) 3-25.

C. by Design, Well-Defined Single-Site Heterogeneous Catalysts Pelletier, Jeremie DA; Basset, Jean-Marie, Acc. Chem. Res., 49 (2016) 664-677.

P. Ji, K. Manna, Z. Lin, A. Urban, F.X. Greene, G. Lan, W. Lin, Single-Site Cobalt Catalysts at New Zr8 (µ2-O)8 (µ2-OH)4 Metal-Organic Framework Nodes for Highly Active Hydrogenation of Alkenes, Imines, Carbonyls, and Heterocycles, J. Am. Chem. Soc., 138 (2016) 12234-12242.

R.C. Klet, S. Tussupbayev, J. Borycz, J.R. Gallagher, M.M. Stalzer, J.T. Miller, L. Gagliardi, J.T. Hupp, T.J. Marks, C.J. Cramer, Single-Site Organozirconium Catalyst Embedded in a Metal-Organic Framework, J. Am. Chem. Soc, 137 (2015) 15680-15683.

J. Canivet, S. Aguado, Y. Schuurman, D. Farrusseng, MOF-supported selective ethylene dimerization single-site catalysts through one-pot postsynthetic modification, J. Am. Chem. Soc., 135 (2013) 4195-4198.

B. Hu, N.M. Schweitzer, G. Zhang, S.J. Kraft, D.J. Childers, M.P. Land, J.T. Miller, A.S. Hock, Isolated FeII on Silica as a Selective Propane Dehydrogenation Catalyst, ACS Catal., 5 (2015) 3494-3503.

N.M. Schweitzer, B. Hu, U. Das, H. Kim, J. Greeley, L.A. Curtiss, P.C. Stair, J.T. Miller, A.S. Hock, Propylene Hydrogenation and Propane Dehydrogenation by a Single-Site Zn2+ on Silica Catalyst, ACS Catal., 4 (2014) 1091-1098.

(56) References Cited

PUBLICATIONS

H. Sohn, J. Camacho-Bunquin, R. Langeslay, P. Ignacio-de Leon, J. Niklas, O. Poluektov, C. Liu, J. Connell, D. Yang, J. Kropf, Isolated, well-defined organovanadium (III) on silica: single-site catalyst for hydrogenation of alkenes and alkynes, Chem. Comm., (2017).

L. Dong, Z.A. Gao, N. Lin, Self-assembly of metal-organic coordination structures on surfaces, Prog. Surf. Sci., 91 (2016) 101-135.

F. Klappenberger, A. Weber-Bargioni, W. Auwaerter, M. Marschall, A. Schiffrin, J.V. Barth, Temperature dependence of conformation, chemical state, and metal-directed assembly of tetrapyridylporphyrin on Cu(111), J. Chem. Phys., 129 (2008).

J. Boscoboinik, J. Kestell, M. Garvey, M. Weinert, W.T. Tysoe, Creation of Low-Coordination Gold Sites on Au(111) Surface by 1,4-phenylene Diisocyanide Adsorption, Top. Catal., 54 (2011) 20-25.

D. Skomski, C.D. Tempas, G.S. Bukowski, K.A. Smith, S.L. Tait, Redox-active on-surface polymerization of single-site divalent cations from pure metals by a ketone-functionalized phenanthroline, J. Chem. Phys., 142 (2015) 101913.

D. Skomski, C.D. Tempas, B.J. Cook, A.V. Polezhaev, K.A. Smith, K.G. Caulton, S.L. Tait, Two- and Three-Electron Oxidation of Single-Site Vanadium Centers at Surfaces by Ligand Design, J. Am. Chem. Soc., 137 (2015) 7898-7902.

J.V. Barth, Fresh perspectives for surface coordination chemistry, Surf. Sci., 603 (2009) 1533-1541.

M.A. Lingenfelder, H. Spillmann, A. Dmitriev, S. Stepanow, N. Lin, J.V. Barth, K. Kern, Towards surface-supported supramolecular architectures: tailored coordination assembly of 1,4-benzenedicarboxylate and Fe on Cu(100), Chem. Eur. J., 10 (2004) 1913-1919.

R. Gutzler, S. Stepanow, D. Grumelli, M. Lingenfelder, K. Kern, Mimicking Enzymatic Active Sites on Surfaces for Energy Conversion Chemistry, Acc. Chem. Res., 48 (2015) 2132-2139.

C.D. Tempas, T. Morris, D.L. Wisman, D. Le, N.U. Din, C.G. Williams, M. Wang, A.V. Polezhaev, T.S. Rahman, K.G. Caulton, S.L. Tait, Redox-active ligand controlled selectivity of vanadium oxidation on Au(100), Chem. Sci., 9 (2018) 1674-1685.

S. Fabris, S. Stepanow, N. Lin, P. Gambardella, A. Dmitriev, J. Honolka, S. Baroni, K. Kern, Oxygen Dissociation by Concerted Action of Di-Iron Centers in Metal-Organic Coordination Networks at Surfaces: Modeling Non-Heme Iron Enzymes, Nano Lett., 11 (2011) 5414-5420.

Z. Paal, A. Gyory, I. Uszkurat, S. Olivier, M. Guerin, C. Kappenstein, Pt/Al2O3 catalysts and Pt—Sn/Al2O3 catalysts prepared by two different methods: Hydrogen pressure effects in the reactions of n-hexane, J. Catal., 168 (1997) 164-175.

A. Dolev, G.E. Shter, G.S. Grader, Synthesis and structural characterization of Pt/amorphous Al2O catalyst, J. Catal., 214 (2003) 146-152.

D. Svoronos, H. Grigoropoulou, C. Philippopoulos, Effect of Pt/Al2O3 catalyst preparation conditions upon its activity in nitric oxide reduction, Appl. Catal., B, 5 (1995) 319-328.

N. An, X. Yuan, B. Pan, Q. Li, S. Li, W. Zhang, Design of a highly active Pt/Al2O3 catalyst for low-temperature CO oxidation, RSC Adv., 4 (2014) 38250-38257.

G. Jacobs, L. Williams, U. Graham, D. Sparks, B.H. Davis, Low-Temperature Water-Gas Shift: In-Situ DRIFTS-Reaction Study of a Pt/CeO2 Catalyst for Fuel Cell Reformer Applications, J. Phys. Chem. B, 107 (2003) 10398-10404.

V.P. Pakharukova, I.Y. Pakharukov, V.I. Bukhtiyarov, V.N. Parmon, Alumina-supported platinum catalysts: Local atomic structure and catalytic activity for complete methane oxidation, Appl. Catal., A, 486 (2014) 12-18.

I.E. Beck, V.I. Bukhtiyarov, I.Y. Pakharukov, V.I. Zaikovsky, V.V. Kriventsov, V.N. Parmon, Platinum nanoparticles on Al2O3: Correlation between the particle size and activity in total methane oxidation, J. Catal., 268 (2009) 60-67.

J.E. Benson, M. Boudart, Hydrogen-oxygen titration method for the measurement of supported platinum surface areas, J. Catal., 4 (1965) 704-710.

D. Mears, R. Hansford, The stoichiometry for hydrogen titration of oxygen on supported platinum, J. Catal., 9 (1967) 125-134.

J. Prasad, K. Murthy, P. Menon, The stoichiometry of hydrogen-oxygen titrations on supported platinum catalysts, J. Catal., 52 (1978) 515-520.

B. Ravel, M. Newville, Athena, Artemis, Hephaestus: data analysis for X-ray absorption spectroscopy using IFEFFIT, J. Synchrotron Radiat., 12 (2005) 537-541.

M. Newville, EXAFS analysis using FEFF and FEFFIT, J. Synchrotron Radiat., 8 (2001) 96-100.

M. Newville, IFEFFIT: interactive XAFS analysis and FEFF fitting, J. Synchrotron Radiat., 8 (2001) 322-324.

W.P. Davey, Precision measurements of the lattice constants of twelve common metals, Phys. Rev., 25 (1925) 753.

K. Sakai, Y. Yokoyama, K. Okamoto, S. Takahashi, (4-Amino-2, 2'-bipyridine) dichloroplatinum (II) dihydrate, Acta Crystallogr. E, 59 (2003) m518-m520.

R. Faggiani, B. Lippert, C. Lock, B. Rosenberg, Hydroxo-bridged platinum (II) complexes. 1. Di-. mu.-hydroxo-bis diammineplatinum (II)] nitrate,[(NH3)2Pt(OH)2Pt(NH3)2](NO3)2. Crystalline structure and vibrational spectra, J. Am. Chem. Soc., 99 (1977) 777-781.

H.R. Hoekstra, S. Siegel, F.X. Gallagher, Reaction of platinum dioxide with some metal oxides, in, ACS Publications, 1971.

J.L. Speier, J.A. Webster, G.H. Barnes, The addition of silicon hydrides to olefinic double bonds. Part II. The use of group VIII metal catalysts, J. Am. Chem. Soc., 79 (1957) 974-979.

J.L. Speier, Homogeneous catalysis of hydrosilation by transition metals, in: Advances in Organometallic Chemistry, Elsevier, 1979, pp. 407-447.

K. Asakura, H. Nagahiro, N. Ichikuni, Y. Iwasawa, Structure and catalytic combustion activity of atomically dispersed Pt species at MgO surface, Appl. Catal., A, 188 (1999) 313-324.

J. Clarke, M. Bradley, L. Garvie, A. Craven, T. Baird, Pt/MgO as Catalyst for Hydrogenolysis Reactions of C 5 and C 6 Hydrocarbons: Evidence for Metal-Support Interactions, J. Catal., 143 (1993) 122-137.

T. Tanabe, Y. Nagai, K. Dohmae, H. Sobukawa, H. Shinjoh, Sintering and redispersion behavior of Pt on Pt/MgO, J. Catal., 257 (2008) 117-124.

Y. Yazawa, N. Takagi, H. Yoshida, S.-i. Komai, A. Satsuma, T. Tanaka, S. Yoshida, T. Hattori, The support effect on propane combustion over platinum catalyst: control of the oxidation-resistance of platinum by the acid strength of support materials, Appl. Catal., A, 233 (2002) 103-112.

H.C. Choi, S.H. Choi, O.B. Yang, J.S. Lee, K.H. Lee, Y.G. Kim, Hydrodechlorination of carbon tetrachloride over Pt/MgO, J. Catal., 161 (1996) 790-797.

D. Le, T.S. Rahman, Pt-Dipyridyl Tetrazine metal-organic network on the Au (100) surface: Insights from first principles calculations, Faraday Discuss., (2017).

M. Kosmulski, Attempt to determine pristine points of zero charge of Nb2O5, Ta2O5, and HfO2, Langmuir, 13 (1997) 6315-6320.

C. Morterra, S. Coluccia, A. Chiorino, F. Boccuzzi, Infrared study of the adsorption of pyridine on α-Al2O3, J. Catal., 54 (1978) 348-364.

M.W. Urban, J.L. Koenig, Determination of the orientation of adsorbed pyridine and γ-MPS on alumina surface by photoacoustic FT-IR spectroscopy, Appl. Spectrosc., 40 (1986) 851-856.

M.I. Zaki, M.A. Hasan, F.A. Al-Sagheer, L. Pasupulety, In situ FTIR spectra of pyridine adsorbed on SiO2—Al2O3, TiO2, ZrO2 and CeO2: general considerations for the identification of acid sites on surfaces of finely divided metal oxides, Colloids Surf., A, 190 (2001) 261-274.

J.A. Lercher, Acid-Base Properties of Al2O3/MgO Oxides, Z. Phys. Chem., 129 (1982) 209-218.

C. Anandan, P. Bera, Growth, characterization and interfacial reaction of magnetron sputtered Pt/CeO2 thin films on Si and Si3N4 substrates, Surf. Interface Anal., 47 (2015) 777-784.

D. Teschner, A. Wootsch, O. Pozdnyakova, H. Sauer, A. Knop-Gericke, R. Schlögl, Surface and structural properties of Pt/CeO2 catalyst under preferential CO oxidation in hydrogen (PROX), React. Kinet. Catal. Lett., 87 (2006) 235-247.

(56) References Cited

PUBLICATIONS

P. Bera, K. Priolkar, A. Gayen, P. Sarode, M. Hegde, S. Emura, R. Kumashiro, V. Jayaram, G. Subbanna, Ionic dispersion of Pt over $CeO_2$ by the combustion method: Structural investigation by XRD, TEM, XPS, and EXAFS, Chem. Mater., 15 (2003) 2049-2060.

P. Bera, A. Gayen, M. Hegde, N. Lalla, L. Spadaro, F. Frusteri, F. Arena, Promoting effect of $CeO_2$ in combustion synthesized $Pt/CeO_2$ catalyst for CO oxidation, J. Phys. Chem. B, 107 (2003) 6122-6130.

S.S. Kim, H.H. Lee, S.C. Hong, A study on the effect of support's reducibility on the reverse water-gas shift reaction over Pt catalysts, Appl. Catal., A, 423 (2012) 100-107.

A. Datye, D. Kalakkad, M. Yao, D.J. Smith, Comparison of metal-support interactions in $Pt/TiO_2$ and $Pt/CeO_2$, J. Catal., 155 (1995) 148-153.

B. Karstedt, Platinum complexes of unsaturated siloxanes and platinum containing organopolysiloxanes, in, Google Patents, 1973.

I.E. Markó, S. Sterin, O. Buisine, G. Berthon, G. Michaud, B. Tinant, J.P. Declercq, Highly Active and Selective Platinum (0)-Carbene Complexes. Efficient, Catalytic Hydrosilylation of Functionalised Olefins, Adv. Synth. Catal., 346 (2004) 1429-1434.

I.E. Markó, S. Stérin, O. Buisine, G. Mignani, P. Branlard, B. Tinant, J.-P. Declercq, Selective and efficient platinum (0)-carbene complexes as hydrosilylation catalysts, Science, 298 (2002) 204-206.

B. Marciniec, Hydrosilylation: a comprehensive review on recent advances, Springer Science & Business Media, 2008. We will provide a book if requested.

J. Stein, L. Lewis, Y. Gao, R. Scott, In situ determination of the active catalyst in hydrosilylation reactions using highly reactive Pt (0) catalyst precursors, J. Am. Chem. Soc., 121 (1999) 3693-3703.

\* cited by examiner a)
b)

SYNTHESIS OF PLATINUM SINGLE-SITE CENTERS THROUGH METAL-LIGAND SELF-ASSEMBLY ON METAL OXIDE SUPPORTS

CROSS REFERENCE TO RELATED APPLICATIONS

This application claims the benefit of provisional application Ser. No. 62/780,593, filed Dec. 17, 2018, the contents of which are hereby incorporated by reference in their entirety.

STATEMENT OF GOVERNMENT RIGHTS

This invention was made with government support under DE-SC0016367 awarded by the Department Of Energy. The government has certain rights in the invention.

FIELD OF THE INVENTION

The invention relates generally to single-site metal catalysts such as Pt single-site centers with a 3,6-di-2-pyridyl-1,2,4,5-tetrazine (DPTZ) ligand on a support such as powdered MgO, $Al_2O_3$, $CeO_2$ or mixtures thereof.

BACKGROUND OF THE INVENTION

Currently, more than 90 percent of industrial chemical processes involve heterogeneous catalysts. Solid catalysts are easily separated and recovered from liquid or gas products, allowing for high cost efficiency and a small waste stream. However, heterogeneous catalysts generally have relatively low selectivity, especially for the selective functionalization of hydrocarbons. The low selectivity is a result of various chemical and coordination environments of the surface atoms on a metal nanoparticle. Heterogeneous single-site catalysts (SSC) have been regarded as a promising solution to these problems [1-5], since they have well-defined, uniform metal centers that are atomically dispersed. Consequently, they have attracted significant attention from the surface science, materials and catalysis communities, and various synthesis strategies are actively under investigation [6-17].

SSC fabrication is challenging because of the thermodynamic instability of single metal atoms. The aggregation of metal atoms is hard to prevent both during synthesis and under reaction conditions, especially when the metal density on the catalyst surface is high [2, 3]. Despite these difficulties, several approaches have been developed to create SSC. In some cases, a small concentration of catalytically active metal can be atomically dispersed on oxides [1, 4, 11, 13, 18-21], metal [9, 10, 22-24], or carbon supports [16, 17, 25-27]. These systems have been studied by both ultra high vacuum (UHV) and ambient pressure techniques. Specific types of surface sites, such as defects, are often crucial to anchor active metal centers. Another common and simple method is to attach catalytic active metal complexes to oxide supports through molecular linkers, which generates immobilized molecular catalysts [28-32]. The application of this type of SSC is limited by thermal stability and economy feasibility [33]. Surface organometallic chemistry and metal-organic framework (MOF) chemistry have also been explored to anchor metal cations directly at surface binding sites [6-8, 12, 15, 34-40]. In recent years, metal-ligand self-assembly on surfaces has emerged as a novel strategy and some success has been achieved on single crystal surfaces [14, 41-48]. The formation of single-site metal centers in these systems is usually achieved by sequential vapor deposition of organic ligand molecules and metals onto metal surfaces in pristine vacuum environments.

Some of these systems show chemical activity [49, 50] and the ability to tune metal oxidation state by ligand designs [45]. The previous work is limited to single crystal surfaces under UHV conditions, which differ significantly from real catalyst support and reaction conditions. Therefore, to enhance the application potential of these systems, a new method that can create similar metal-ligand single-sites on high surface area catalyst supports under ambient pressure is required.

BRIEF SUMMARY OF THE INVENTION

Developing single-site metal catalysts has been regarded as a promising strategy to improve activity and selectivity in heterogeneous catalysis. In one embodiment, a metal-ligand self-assembly method to create Pt single-site centers on metal oxide supports (e.g., powdered metal oxide supports) is provided. Impregnating Pt and a ligand 3,6-di-2-pyridyl-1,2,4,5-tetrazine (DPTZ) simultaneously (one-step) creates Pt-DPTZ single-sites on powdered MgO, $Al_2O_3$, and $CeO_2$. MgO has the most uniform single-sites due to a strong, non-competitive support-ligand interaction, and a support-metal interaction of appropriate strength. Pt(II) centers are stabilized between the N binding pockets of DPTZ, with minimal metallic nanoparticle formation. The system was characterized by XAS, XPS, TEM, XRD, and CO adsorption. Sequential impregnation of Pt and DPTZ (two-step) was also tested on $Al_2O_3$ and $CeO_2$, but is not as effective as the one-step method due to limited Pt accessibility and mobility. These oxide-supported Pt-DPTZ single-sites were found to be effective catalysts in hydrosilylation reactions. The embodiments described herein demonstrate a metal-ligand self-assembly strategy to create metal single-site centers on high surface area catalyst supports.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

Figure 1:
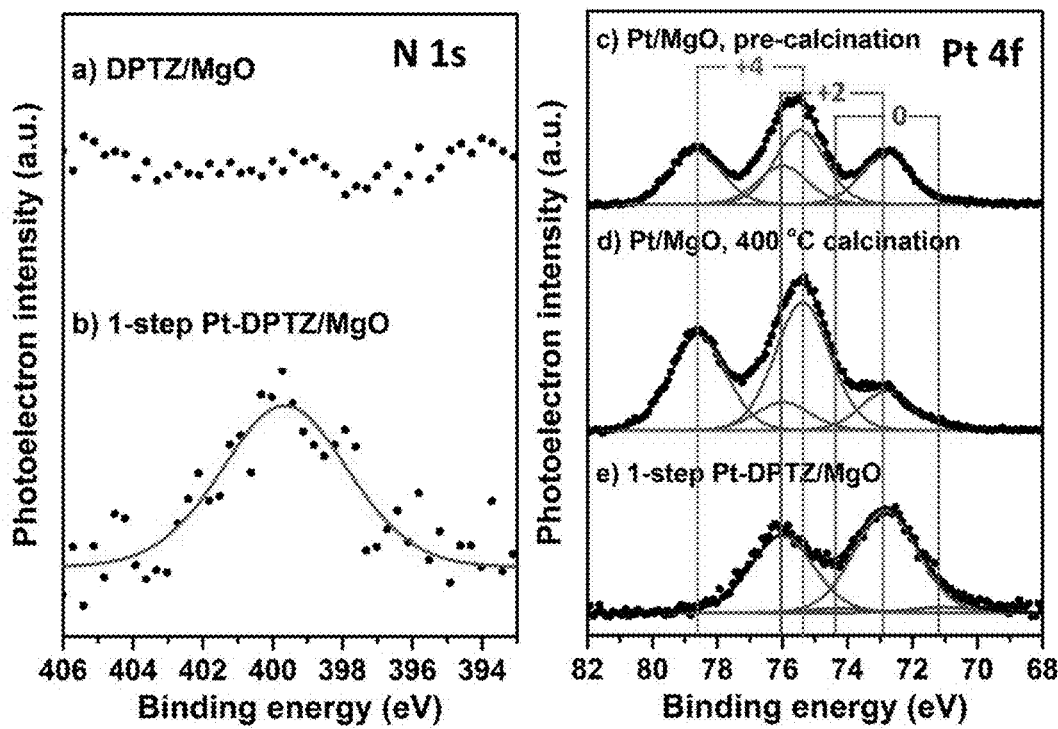
FIG. 1 provides XP spectra of DPTZ, Pt, and one-step Pt-DPTZ on MgO: N 1s region of (a) DPTZ/MgO and (b) one-step Pt-DPTZ/MgO, and Pt 4f region of (c) Pt/MgO pre-calcination, (d) Pt/MgO post-calcination, and (e) one-step Pt-DPTZ/MgO. In all Pt 4f region spectra, blue, red, and green peak pairs correspond approximately to Pt oxidation states of 0, +2, and +4, respectively.

FIG. S1 depicts Previous characterizations of single-site Pt-DPTZ 1D chains on Au(100) single crystal surface under UHV: (a) non-contact atomic force microscopy (NC-AFM) image with molecular resolution showing the formation of Pt-DPTZ chains; (b) molecular model of metal-ligand chains; (c) Pt 4f XPS spectra before (top) and after (bottom) DPTZ deposition, showing Pt centers are oxidized from 0 to +2 oxidation states.

FIG. S2 provides pictures of bare supports and some samples synthesized herein: (a) bare $Al_2O_3$; (b) Pt/$Al_2O_3$, 400° C. calcination; (c) Pt/$Al_2O_3$ 700° C. calcination; (d) two-step Pt-DPTZ/$Al_2O_3$ synthesized from (b); (e) bare MgO after pretreatment; (f) Pt/MgO, 400° C. calcination; (g) one-step Pt-DPTZ/MgO, solvent evaporated at room temperature; (h) bare $CeO_2$; (i) Pt/$CeO_2$, 400° C. calcination; (j) one-step Pt-DPTZ/$CeO_2$, solvent evaporated at room temperature.

FIG. S3 provides molecular structures of model compounds used for Pt $L_3$-edge EXAFS fitting: (a) 4-Amino-2-2'-bipyridine)dichloroplatinum(II) dehydrate and (b) $((NH_3)_2PtOH)_2(NO_3)_2$.

FIG. S4 provides the comparison of Pt—N shell and Pt—O shell calculated by FEFF showing the similarity between the two. The Pt—N shell was calculated from (4-Amino-2-2'-bipyridine)dichloroplatinum(II) dihydrate (Figure S3a), and Pt—O shell was calculated from $((NH_3)_2PtOH)_2(NO_3)_2$ (Figure S3b).

FIG. S5 provides Pt 4f XP spectra of reduced (400° C., 4 h, pure $H_2$) Pt/MgO showing the BE of Pt(0) nanoparticles (~70.9 eV).

FIG. S6 provides N 1s XP spectrum of bulk DPTZ molecules. Two distinctive components are observed: tetrazine N (red) and pyridyl N (blue). The ratio between the two is 2:1, which is consistent with molecular structure of the molecule. The N 1s peak shape of one-step Pt-DPTZ/MgO is consistent with reduced DPTZ upon Pt coordination in experiments in UHV.

FIG. S7 provides EXAFS spectra of one-step Pt-DPTZ/ MgO and its first-shell fitting in (a) k-space and (b) R-space. Panel (b) is a reproduction of FIG. 3a, shown here for comparison to panel (a). The fitting was performed in R-space, and then plotted back into k-space. Fit parameters are given in Table 1.

FIG. S8 provides qualitative comparison of Pt-DPTZ/ MgO second shell EXAFS with potential scattering paths, showing the absence of Pt—Pt shell. Black and red curves represent original EXAFS data and the first-shell fitting envelope. Other potential scattering paths are presented as the following: (a) Pt—C5 single scattering; (b) Pt—Cl single scattering; (c) Pt—Pt single scattering; (d) Pt—C8 single scattering; (e) Pt—C7 single scattering; (f) Pt—N1-C5 multiple scattering; (g) Pt—N1-C1 multiple scattering; (h) Pt—N1-C11 multiple scattering. Pt—Pt path was calculated from metallic Pt crystal, and all other paths were calculated from (4-Amino-2-2'-bipyridine)dichloroplatinum(II) dihydrate (FIG. S3a). For example, the three features between 3 A and 4 A are likely due to Pt—C distances for C in the DPTZ ligand. These could also be attributed to atoms in the MgO support if the Pt has a sufficiently strong interaction with the MgO to sit in a specific adsorption site, which may not be the case in the presence of the ligand.

FIG. S9 provides CO adsorption DRIFTS spectra of one-step Pt-DPTZ/MgO. Red curve: as-synthesized; blue curve: after 550° C. calcination. The Pt—$CO_{ads}$ vibration peak is absent on as-synthesized sample, suggesting very little Pt nanoparticles are formed. After high-temperature calcination, DPTZ decomposes, and Pt atoms aggregates into nanoparticles, so the feature shows up. The peaks between 2000 and 2050 $cm^{-1}$ are likely from bridging CO bound to surface defect.

FIG. S10 provides EXAFS spectra of one-step Pt-DPTZ/ $CeO_2$ and its first-shell fitting in (a) k-space and (b) R-space. Panel (b) is a reproduction of FIG. 3b, shown here for comparison to panel (a). The fitting was performed in R-space, and then plotted back into k-space. Fit parameters are given in Table 1.

FIG. S11 provides XP spectra of (a) Pt/$CeO_2$ calcined at 400° C., Pt 4f region, and (b) DPTZ/$CeO_2$, N 1s region.

FIG. S12 provides XRD patterns of bare $Al_2O_3$(black), Pt/$Al_2O_3$ calcined at 700° C. (red), and two-step Pt-DPTZ/ $Al_2O_3$ synthesized from the sample represented by the red curve (blue). The calcination was performed at 700° C. for this experiment because Pt peaks do not show up after calcination at lower temperature (no perfect crystal formed).

FIG. S13 provides a) Structure of Karstedt catalyst [4]. b) Photo of post-reaction solutions using various catalysts; from left to right: Speier catalyst, Karstedt catalyst, one-step Pt-DPTZ/MgO, and one-step Pt-DPTZ/$CeO_2$. Solutions with commercial homogeneous catalysts show significantly darker yellow than those with oxide-supported Pt-DPTZ SSCs.

DETAILED DESCRIPTION

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

In the following embodiments, synthetic methods based on traditional wet impregnation were developed, to create Pt single-sites using the metal-ligand self-assembly between Pt and the ligand 3,6-di-2-pyridyl-1,2,4,5-tetrazine (DPTZ, structure see Scheme 1a). This system was selected because UHV studies showed high thermal stability and the ability of DPTZ to extract Pt from nanoparticles on single crystal surfaces [14]. A uniform, catalytically active single-site structure with 90% atomically dispersed Pt was created, and characterized by multiple techniques. The structure and distribution of Pt species were proved to be sensitive to synthesis methods, solvent evaporation conditions, and supports. The results from the embodiments described herein were also compared with previous single crystal work to highlight the different behavior of metal and ligand. This extends the potential application of metal-ligand self-assembly strategies for SSC synthesis by demonstrating their formation on high surface area catalyst supports. It also provides understanding to establish systematic SSC synthesis procedures.

Scheme 1

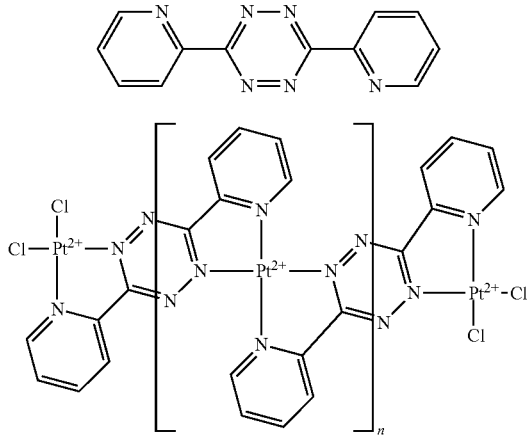

(a) Structure of DPTZ ligand.
(b) Potential structure of Pt singe-site centers in Pt-DPTZ complexes, illustrating quasi-square planar coordination geometry and likely Cl bonding on some Pt. Pt binding with surface oxygen also exits, but is not included in this drawing. "n" is from 2 to about 5.

The supported DPTZ ligand acts as a catalyst for hydrosilylation reactions. A catalyst is essential for this reaction. Current industrial production of silane materials relies on the Karstedt catalyst and the present invention shows some improvement over that catalyst with the new material described herein. Silane and silicon compounds are employed to enhance adhesion, increase mechanical properties of composites, improve dispersion of pigments and minerals, provide crosslinking, immobilize catalysts, and bind biomaterials.

Catalysts are characterized by activity and selectivity. Activity refers to how much of the starting material in converted into a product material. Selectivity refers to the idea that a reaction might produce multiple products, but that it is usually desirable to obtain only one of those. The new catalyst material described herein outperforms the Karstedt catalyst in both activity and selectivity, thus there would be an improvement to the chemical production of silanes using this new material.

The presently described catalyst functions by using a redox complexation strategy, where an electron accepting ligand is mixed with a Pt precursor salt in solution to oxidize the Pt and stabilize single site Pt centers. The single-site centers have a well-defined chemical environment due to the presence of the DPTZ ligand.

The following paragraphs enumerated consecutively from (1) through 49 provide for various aspects of the present invention. In one embodiment, in a first paragraph (1), the present invention provides a single site catalyst system comprising: (a) a single site catalyst precursor compound and (b) a support, wherein the single site catalyst precursor comprises the formula:

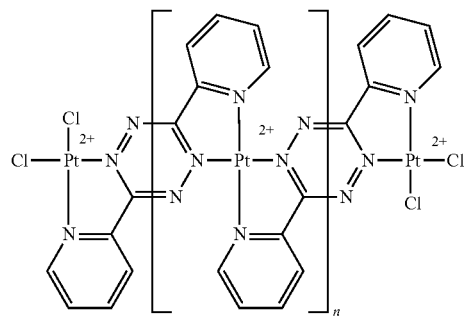

wherein n is 2 to 5.

2. The single site catalyst system of paragraph 1, wherein the support comprises MgO, Al$_2$O$_3$, CeO$_2$ or mixtures thereof.

3. The single site catalyst system of paragraph 2, wherein the support comprises MgO.

4. The single site catalyst system of paragraph 2, wherein the support comprises Al$_2$O$_3$ or CeO$_2$.

5. A process comprising:
(a) contacting a single site catalyst precursor comprising the formula:

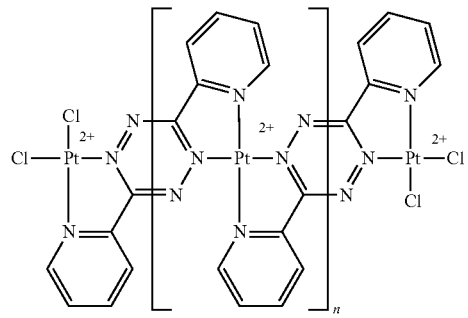

wherein n is 2 to 5 and a support to form a supported catalyst;
(b) contacting the supported catalyst system, a vinyl terminated alkene and a hydrosilylation agent under hydrosilylation conditions; and (c) hydrosilylating the vinyl terminated alkene to form a hydrosilylated alkyl product.

6. The process of paragraph 5, wherein the support comprises MgO, $Al_2O_3$, $CeO_2$ or mixtures thereof.

7. The process of paragraph 6, wherein the support comprises MgO.

8. The process of paragraph 6, wherein the support comprises $Al_2O_3$ or $CeO_2$.

9. The process of any of paragraphs 5 through 8, wherein the vinyl terminated alkene is 1-octene 10. The process of any of paragraphs 5 through 9, wherein the hydrosilylation agent comprises dimethoxymethylsilane.

11. A process comprising:
(a) treating 3,6-di-2-pyridyl-1,2,4,5-tetrazine with a support in a solvent to form a first mixture;
(b) stirring the first mixture at room temperature for a period of time to form a second mixture;
(c) treating the second mixture with $H_2PtCl_6 \cdot 6H_2O$ to form a third mixture; and
(d) drying the third mixture to remove the solvent to provide dried catalyst.

12. The process of paragraph 11, further comprising the step:
(e) washing the dried catalyst with water to provide a water washed catalyst;
(f) washing the water washed catalyst of step (e) with dichloromethane (DCM) until free 3,6-di-2-pyridyl-1,2,4,5-tetrazine is removed from the water washed catalyst to provide a supported catalyst.

13. The process of paragraphs 11 or 12, wherein the support comprises MgO, $Al_2O_3$, $CeO_2$ and mixtures thereof.

14. The process of paragraph 13, wherein the support comprise MgO.

15. The process of paragraph 13, wherein the support comprises $Al_2O_3$ or $CeO_2$.

16. A process comprising:
(a) contacting the supported catalyst system of any of paragraphs 11 through 15, a vinyl terminated alkene and a hydrosilylation agent under hydrosilylation conditions; and
(b) hydrosilylating the vinyl terminated alkene to form a hydrosilylated alkyl product.

17. The process of paragraph 16, wherein the vinyl terminated alkene is 1-octene 18. The process of either paragraph 16 or paragraph 17, wherein the hydrosilylation agent comprises dimethoxymethylsilane.

19. A process comprising:
(a) mixing $H_2PtCl_6 \cdot 6H_2O$ and a support in water to form a mixture;
(b) drying the mixture to provide a dried mixture;
(c) washing the dried mixture with water to provide a rinsed mixture;
(d) calcining the rinsed mixture at a temperature range of about 500 to about 700 degrees centigrade to provide a calcined mixture;
(e) combining the calcined mixture with 3,6-di-2-pyridyl-1,2,4,5-tetrazine in a solvent to provide a mixture; and
(f) washing the mixture of step (e) with the solvent; and
(g) drying the mixture of step (f) to provide a supported catalyst.

20. The process of paragraph 19, wherein the support comprises MgO, $Al_2O_3$, $CeO_2$ or mixtures thereof.

21. The process of paragraph 20, wherein the support comprises MgO.

22. The process of paragraph 20, wherein the support comprises $Al_2O_3$ or $CeO_2$.

23. A process comprising:
(a) contacting the supported catalyst system of any of paragraphs 19 through 22, a vinyl terminated alkene and a hydrosilylation agent under hydrosilylation conditions; and
(b) hydrosilylating the vinyl terminated alkene to form a hydrosilylated alkyl product.

24. The process of paragraph 23, wherein the vinyl terminated alkene is 1-octene 25. The process of either paragraph 23 or paragraph 24, wherein the hydrosilylation agent comprises dimethoxymethylsilane.

26. The single site catalyst system of paragraph 2, wherein the support comprises $CeO_2$.

27. The process of paragraph 6, wherein the support comprises $CeO_2$.

28. The process of paragraph 13, wherein the support comprises $CeO_2$.

29. The process of paragraph 20, wherein the support comprises $CeO_2$.

30. A single site catalyst system comprising: (a) a single site catalyst precursor compound and (b) a support, wherein the single site catalyst precursor comprises the formula:

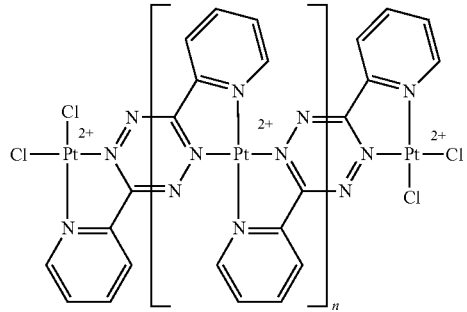

wherein n is 2 to 5.

31. The single site catalyst system of paragraph 30, wherein the support comprises MgO, $Al_2O_3$, $CeO_2$ and mixtures thereof.

32. The process of paragraph 30, wherein the support is powdered.

33. The process of paragraph 32, wherein the support comprises $CeO_2$.

34. A process comprising:
(a) contacting a single site catalyst precursor comprising the formula:

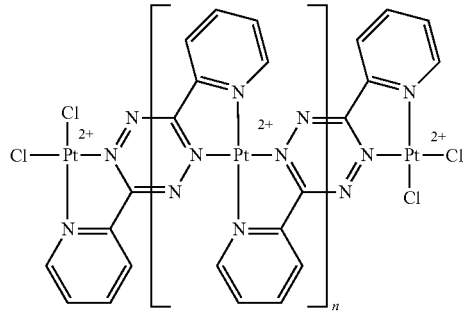

wherein n is 2 to 5 and a support to form a supported catalyst;
(b) contacting the supported catalyst system, a vinyl terminated alkene and a hydrosilylation agent under hydrosilylation conditions; and (c) hydrosilylating the vinyl terminated alkene to form a hydrosilylated alkyl product.

35. The process of paragraph 34, wherein the support comprises MgO, $Al_2O_3$, $CeO_2$ and mixtures thereof.

36. The process of paragraph 34, wherein the support is powdered.

37. The process of paragraph 36, wherein the support comprises $CeO_2$.

38. The process of paragraph 34, wherein the vinyl terminated alkene is 1-octene 39. The process of paragraph 34, wherein the hydrosilylation agent comprises dimethoxymethylsilane.

40. A process comprising:
(a) mixing $H_2PtCl_6 \cdot 6H_2O$ and a support in water to form a mixture;
(b) drying the mixture to provide a dried mixture;
(c) washing the dried mixture with water to provide a rinsed mixture;
(d) calcining the rinsed mixture at a temperature range of about 500 to about 700 degrees centigrade to provide a calcined mixture;
(e) combining the calcined mixture with 3,6-di-2-pyridyl-1,2,4,5-tetrazine in a solvent to provide a mixture; and
(f) washing the mixture of step (e) with the solvent; and
(g) drying the supported catalyst.

41. The process of paragraph 40, wherein the support comprises MgO, $Al_2O_3$, $CeO_2$ or mixtures thereof.

42. The process of paragraph 40, wherein the support is powdered.

43. The process of paragraph 42, wherein the support comprises $CeO_2$.

44. A process comprising:
(a) contacting the supported catalyst system of paragraph 11, a vinyl terminated alkene and a hydrosilylation agent under hydrosilylation conditions; and
(b) hydrosilylating the vinyl terminated alkene to form a hydrosilylated alkyl product.

45. The process of paragraph 44, wherein the vinyl terminated alkene is 1-octene.

46. The process of paragraph 44, wherein the hydrosilylation agent comprises dimethoxymethylsilane.

47. The process of paragraph 44, wherein the supported catalyst system comprises powdered $CeO_2$ as the support.

48. The process of paragraph 47, wherein the vinyl terminated alkene is 1-octene 49. The process of paragraph 47, wherein the hydrosilylation agent comprises dimethoxymethylsilane.

Examples

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

Metal Single-Site Synthesis

Two methods were tested for synthesis of the metal single-site materials. The one-step synthesis method of Pt-DPTZ/MgO is based on wet impregnation methods, but with addition of DPTZ ligand at the metal impregnation step. 0.0108 g DPTZ were completely dissolved in 25 mL 1-butanol (Alfa Aesar) by stirring for 20 min at room temperature. 0.3 g MgO (ground to 60 mesh, BET surface area≈4.8 $m^2/g$) were added to the pink DPTZ solution. The mixture was then stirred for 2 h at room temperature. 0.0080 g $H_2PtCl_6 \cdot 6H_2O$ (1 wt % by Pt; 3 eq. DPTZ with Pt) were dissolved in 5 mL 1-butanol. The Pt salt solution was then added to the MgO/DPTZ/1-butanol mixture dropwise under stirring within 30 min. The mixture was covered and stirred overnight, and then dried either at room temperature under dry air flow for 24 h, or at 100° C. overnight. The dried catalyst was washed with water and then dichloromethane (DCM until powders did not show any pink color (all free DPTZ were removed). The synthesis of one-step Pt-DPTZ/$Al_2O_3$ and Pt-DPTZ/$CeO_2$ followed the same procedure, with MgO powders replaced by $Al_2O_3$ (ground to 60 mesh, BET surface area≈195 $m^2/g$) or $CeO_2$ (BET surface area≈5.1 $m^2/g$) of the same mass. Each of the three pristine oxide powders is white in color and each becomes yellow after the one-step Pt-DPTZ impregnation (FIG. S2).

The two-step synthesis method of two-step Pt-DPTZ/$Al_2O_3$ is also based on wet impregnation methods. The first step followed a typical wet impregnation recipe to deposit Pt nanoparticles onto oxide supports [51-55]. 0.0080 g $H_2PtCl_6 \cdot 6H_2O$ were dissolved in 5 mL water, and then added dropwise to 0.3 g $Al_2O_3$ suspended in 10 mL water within 30 min. The mixture was stirred for 3 h, and dried at 100° C. overnight. The resulted Pt/$Al_2O_3$ was then washed with water, filtered, and calcined under dry air flow for 4 h. Depending on calcination temperature, Pt/$Al_2O_3$ powders are either light yellow (<600° C.) or grey (700° C.) in color (FIG. S2b and S2c). In the second step, 0.0108 g DPTZ was impregnated onto 0.3 g calcined Pt/$Al_2O_3$ using a similar procedure as the first step, with DCM used as solvent instead of water. There was no calcination performed after the second step, and the powders were washed with DCM multiple times to remove all free DPTZ (until no pink color). The resulted two-step Pt-DPTZ/$Al_2O_3$ are yellow powders (FIG. S2d). The synthesis of two-step Pt-DPTZ/MgO and Pt-DPTZ/$CeO_2$ followed the same procedure, with $Al_2O_3$ powders replaced by MgO or $CeO_2$ of same mass. Both Pt/MgO calcined at 400° C. (FIG. S2f) and two-step Pt-DPTZ/MgO are yellow-grey. Both Pt/$CeO_2$ calcined at 400° C. (FIG. S2i) and two-step Pt-DPTZ/$CeO_2$ synthesized from it are yellow-brown powders.

Catalyst Characterization

X-ray photoelectron spectroscopy (XPS) measurements were recorded with a PHI Versaprobe II XP spectrometer using a monochromated Al X-ray source. N 1s, C 1s, O 1s and Cl 2p regions were collected for all samples at room temperature. Pt 4d and Al 2p regions were collected for all $Al_2O_3$-supported samples, while the Pt 4f and Mg 2s (or Ce 3d) regions were collected for all MgO (or $CeO_2$)-supported samples. Pt 4d was used instead of Pt 4f for $Al_2O_3$-supported samples because the Pt 4f region overlaps with the Al 2p region. The binding energy (BE) was corrected with the Al 2p peak (74.0 eV) for $Al_2O_3$-supported samples, C is peak (284.6 eV) for magnesia-supported samples, and Ce $3d_{5/2}$ main peak (882.4 eV) for $CeO_2$-supported samples. The DPTZ loading was quantified using the area ratio between the N 1s peak and the Pt 4d or Pt 4f peak. Peak fitting of Pt regions was deconvoluted using peak BE positions for different oxidation states of Pt (0, II, and IV), which are published in the literature [14, 56, 57]. Each component includes a pair of peaks with fixed BE separation and $4d_{5/2}$:$4d_{3/2}$ or $4f_{7/2}$:$4f_{5/2}$ area ratio. The full width at half maximum of all peaks within a region were set to be identical.

X-ray adsorption spectroscopy (XAS) measurements were conducted at the 9-BM beamline at the Advanced Photon Source of Argonne National Laboratory. Each sample was pressed into a pellet with d≈7 mm, and fixed to a sample holder. The monochromatized X-ray energy was calibrated with the $L_3$-edge of a Pt foil (11563.7 eV). X-ray absorption spectra were measured at the Pt $L_3$-edge, from to 11363 to 12365 eV. Both fluorescence and transmission data were collected and are almost identical; fluorescence data were used for analysis. XAS of a Pt foil and of an α-$PtO_2$ pellet were measured as standard references.

Transmission electron microscopy (TEM) imaging was performed at Indiana University Electron Microscopy Center, with a JEOL JEM 3200FS microscope.

X-ray diffraction (XRD) measurements were recorded with a Panalytical Empyrean Diffractometer equipped with a Cu Kα X-ray source and a transmission-reflection spinner. The θ range was from 20° to 90°, with a step of 0.02°.

CO adsorption experiments were performed with a DiffuseIR environmental chamber (PIKE Technologies, 162-4160, HTV) at room temperature (30° C.). Background was collected under Ar flow, then 10% CO in Ar was flowed through the chamber for 30 min, before diffuse reflectance infrared Fourier transform spectra (DRIFTS) were collected with a Magna 550 FTIR spectrometer (Nicolet). Each DRIFT spectrum was an average of 1000 scans, and presented in the Kubelka-Munk form.

Hydrogen-oxygen titration measurements were conducted in a customized flow reactor to quantify Pt dispersion of Pt/$Al_2O_3$ samples. The reactor was connected to a mass spectrometer with a capillary. The experiments followed a well-established standard procedure [58-60]. 100 mg Pt/$Al_2O_3$ was loaded into the catalyst bed, and completely poisoned with $O_2$ flow. The flow was then switched to $H_2$ and $H_2$ uptake due to reaction with O on surface Pt was quantified. The dispersion of the catalyst was calculated from Pt surface area and the total number of Pt atoms (from catalyst mass and wt % of Pt).

EXAFS Data Fitting

The modeling of Pt L3-edge extended x-ray absorption fine structure (EXAFS) spectroscopy data was performed using Demeter XAS data processing package (version 0.9.25) [61]. $E_o$ was first determined as the energy at which the intensity has maximum first derivative. XAS data were normalized after subtracting a line from the pre-edge, and backgrounds were subtracted from the spectra to obtain the EXAFS (x(k)), where $k=2m_e(E-E0)/\hbar$ and $m_e$ and $\hbar$ are the electron mass and Plank's constant, respectively. Scattering paths relevant for fitting were obtained from FEFF calculations [62, 63] with crystal data from Pt (Pt—Pt shell at 2.77 Å) [64], (4-Amino-2-2'-bipyridine)dichloroplatinum(II) dihydrate (FIG. S3a, Pt—N shell at 2.00 Å, Pt—Cl shell at 2.29 Å, and Pt—C shells at 2.84 Å, 3.01 Å, 3.54 Å, and 3.74 Å) [65], and $((NH_3)_2PtOH)_2(NO_3)_2$ (FIG. S3b, Pt—O shell at 2.04 Å) [66]. The latter was used to calculate Pt—O paths instead of the more common α-PtO2 (Pt—O shell at 2.07 Å) [67] because of the greater similarity to the present system.

For the first shell fitting (1 Å<R<2.21 Å), Pt—Cl and Pt—N paths were considered. The FEFF calculations based on model compounds (FIG. S4) indicate that Pt—N and Pt—O paths are difficult to distinguish, so both were treated both with the Pt—N path. Fitting to EXAFS of Pt foil standard samples provided an estimation of $S_o^2$ (passive electron reduction factor)=0.8. $\Delta E_o$ (correction in $E_o$) was set as an independent parameter, and assumed to be identical for all shells. The coordination number (N) of Pt—Cl shell was fixed to the Cl:Pt value determined from XPS measurements. N(Pt—N/O) was set as an independent parameter. ΔR (correction in average distance between the absorber atom and atoms in the interested shell) and $\sigma^2$ (Debye-Waller factor) were set as independent parameters for each shell.

Catalytic Activity Test

The hydrosilylation reaction between 1-octene (Alfa Aesar, 97+%) and dimethoxymethylsilane (Alfa Aesar, 97%) was performed in a closed reaction tube. 2.5 mmol dimethoxymethylsilane and 3.0 mmol 1-octene were mixed with 1.5 mL toluene, and then pre-heated to desired reaction temperature in a water bath. Catalysts containing 18 or 13 ppm Pt were also pre-heated at the same temperature. Speier catalyst was prepared in-house by mixing 0.0038 g $H_2PtCl_6 \cdot 6H_2O$ with 6.48 g isopropanol (175 ppm as-prepared), as previously reported in the literature [68, 69]. Karstedt catalyst was purchased from Sigma-Aldrich (as 2 Pt wt % xylene solution) and diluted to 0.1 Pt wt % with toluene. The reactant solution was then mixed with catalyst to allow the reaction occur. After reaction, solid catalysts were removed by filtration or centrifuge, and the solution was diluted to 25 mL in toluene. GC-MS was then performed on the solution to quantify conversions and yields.

Synthesis and Characterization of Single-Site Pt-DPTZ/MgO

Ligand DPTZ and Pt precursor $H_2PtCl_6 \cdot 6H_2O$ were impregnated onto MgO powders using the one-step method described above. DPTZ was chosen because the nitrogen bidentate binding pockets (Scheme 1a) can coordinate Pt and prevent aggregation and because its electron-accepting capability stabilizes non-zero oxidation state Pt. The one-step synthesis mixture consists of 1% (by weight) Pt (relative to MgO) and three equivalents of DPTZ (relative to Pt). ICP-MS measurements after rinsing show a resulting Pt loading of 0.1% by weight, which is much lower than the 0.73% loading of Pt alone on MgO; this indicates the impact of DPTZ on Pt loading.

It was also attempted to synthesize DPTZ/MgO samples following a similar procedure. FIG. 1 exhibits the N 1s XP spectra of one-step Pt-DPTZ/MgO and DPTZ/MgO. One-step Pt-DPTZ/MgO shows an N 1s peak (FIG. 1b), providing DPTZ is successfully deposited onto MgO surface by this method, which is confirmed by a striking color change of powders from white to yellow (FIG. S2e and S2g). Omitting Pt salt from the same procedure (included rinsing) resulted in no signal being detected in the N1s region (FIG. 1a), indicating that the interaction between DPTZ and MgO alone is not capable of maintaining DPTZ on MgO surface, i.e., complexation of DPTZ to Pt is required for stable adsorption. The N 1s XPS peak for one-step Pt-DPTZ/MgO (FIG. 1b) has a completely different peak envelope shape than bulk DPTZ (FIG. S6), appearing as one broad feature rather than two components in a 2:1 area ratio.

The right panel of FIG. 1 shows the Pt 4f XP spectra of Pt/MgO (as-synthesized and calcined at 400° C.) and one-step Pt-DPTZ/MgO. Pt is mostly observed as Pt(IV) on MgO without DPTZ, with some Pt(II) (FIG. 1c). This is consistent with previous reports that impregnating Pt onto MgO generates a stable $Mg_2PtO_4$ mixed oxide phase, and metallic Pt particles can be formed after reduction (FIG. S5) [70-74]. The fraction of Pt(IV) increases after calcination (FIG. 1d), providing it is favored thermodynamically. In contrast, on one-step Pt-DPTZ/MgO, the XPS data show an excellent fit with Pt(II) components (FIG. 1e). The +2 oxidation state of Pt is consistent with Pt-DPTZ single-sites from previous single crystal studies [14]. The XPS data show negligible Pt(IV) intensity for the one-step sample. The difference in Pt oxidation states when depositing Pt along with DPTZ indicates that DPTZ prevents the formation of $Mg_2PtO_4$ species by coordinating with and stabilizing Pt. Consequently, when the solvent evaporates, Pt atoms form complexes with DPTZ (+2 oxidation state). The Pt-DPTZ single-sites are favored over Pt nanoparticles because of the attractive binding pocket and electron-accepting capability of DPTZ.

The single-site formation is further supported by the DPTZ loading (the molar ratio between DPTZ and Pt) calculated from XPS. Previous studies suggest that each DPTZ molecule has two binding pockets, allowing the growth of metal-ligand chains on single crystal surfaces, in which metal and ligand alternate along the row (Scheme 1b) [14, 44, 45]. The DPTZ loading on one-step Pt-DPTZ/MgO is 0.94, matching the theoretical value of Pt-DPTZ single-site chains. There is a considerable amount of Cl (Cl:Pt=1.59 according to XPS) on this sample, indicating that much of the Pt is still bound to Cl instead of DPTZ. The roughness of the MgO powder likely limits the Pt-DPTZ to shorter metal-ligand chains than could be achieved on single crystal surfaces in UHV. Scheme 1b is a simplified drawing showing ideal chain structure because it does not include Pt—O binding. In the actual structure, surface oxygen may replace Cl at chain ends, or bind with Pt from the bottom. One Pt can bind with 0, 1, or 2 surface oxygen depending on its position on MgO surfaces. Although $PtO_x$ species are not likely to form because no Pt(IV) was observed, the presence of $PtO_xCl_y$ single-sites (chain length n=0) cannot be eliminated. After annealing at 70° C. under dry air, DPTZ loading and Pt oxidation state do not change, but Cl:Pt drops from 1.59 to 1.26, suggesting that some Cl has been removed.

Figure 2:
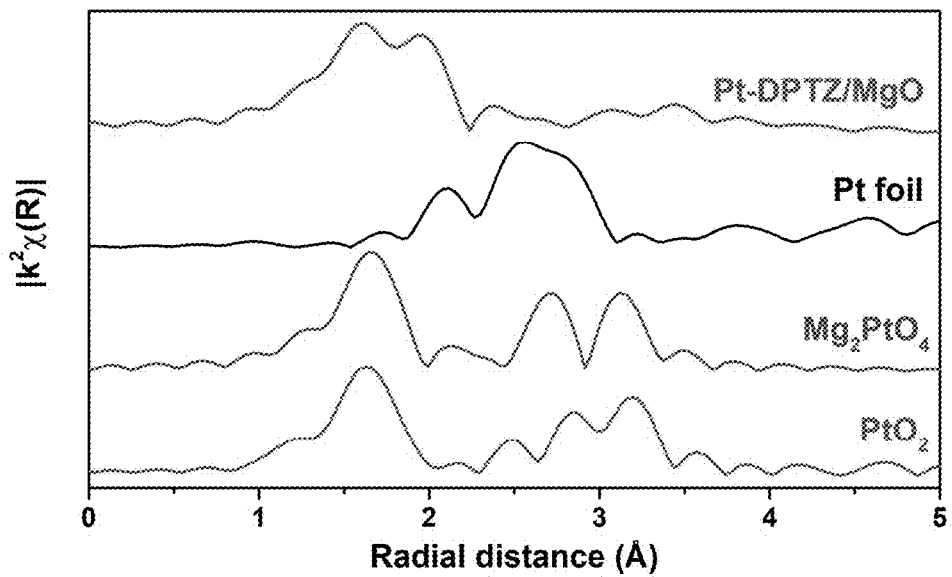
FIG. 2 depicts the comparison between EXAFS Fourier transform magnitudes of one-step Pt-DPTZ/MgO, Pt foil, $Mg_2PtO_4$, and $PtO_2$. The absence of Pt—Pt shell in one-step Pt-DPTZ/MgO is a dominant feature in Pt foil.

The formation of Pt-DPTZ single-sites (Scheme 1b) on MgO is supported by the analysis of Pt $L_3$-edge EXAFS data. In the Fourier transform of the $k^2$-weighted EXAFS spectrum (R-space) of one-step Pt-PDTZ/MgO (FIG. 2), the first Pt—Pt path (R=2.65 Å, compare to Pt foil) is obviously missing, suggesting that Pt atoms do not aggregate into particles or clusters. Oxide $PtO_2$ particles can be excluded, as the Pt—Pt path and second Pt—O path (compare to bulk $PtO_2$) are not present in the sample. The spectrum is also significantly different from that of $Mg_2PtO_4$, indicating that this mixed oxide phase, which is formed when impregnating Pt onto MgO, is also not present.

and 2.037 Å for $((NH_3)_2PtOH)_2(NO_3)_2)$. This provides that this path has contributions from both Pt—N and Pt—O paths, indicating Pt-DPTZ coordination and Pt interaction with surface oxygen. R(Pt—N/O) obtained from the fitting is also very close to previous DFT calculations of Pt-DPTZ on single crystal gold [75]. The total coordination number of Pt from the fitting is 4.9, indicating that most Pt atoms are in square planar geometry, with a Cl binding at on-top sites or a surface oxygen sitting below it. This does not contradict with Scheme 1b, which predicts a total coordination number between 3.5 (each DPTZ contributes 2 Pt—N, no Pt—O binding) and 7.3 (each DPTZ contributes 4 Pt—N, all Pt bind with 2 oxygen). An octahedral geometry of Pt was attempted, but does not produce a reasonable fitting (see Table S1 and accompanying discussion). Alternative fitting models, including different N(Pt—Cl) values, Pt with strict square planar geometry (restraining total coordination number to 4), and the Pt—O path instead of the Pt—N path, were also considered (Table S2 and accompanying discussion), and found to have no better fit quality. EXAFS intensity beyond the first shell is likely due to C or N in DPTZ, MgO support, and multiple scattering paths (FIG. S8). The features beyond the first shell are not consistent with $PtO_2$ or $Mg_2PtO_4$ (see FIG. 2).

Figure 4:
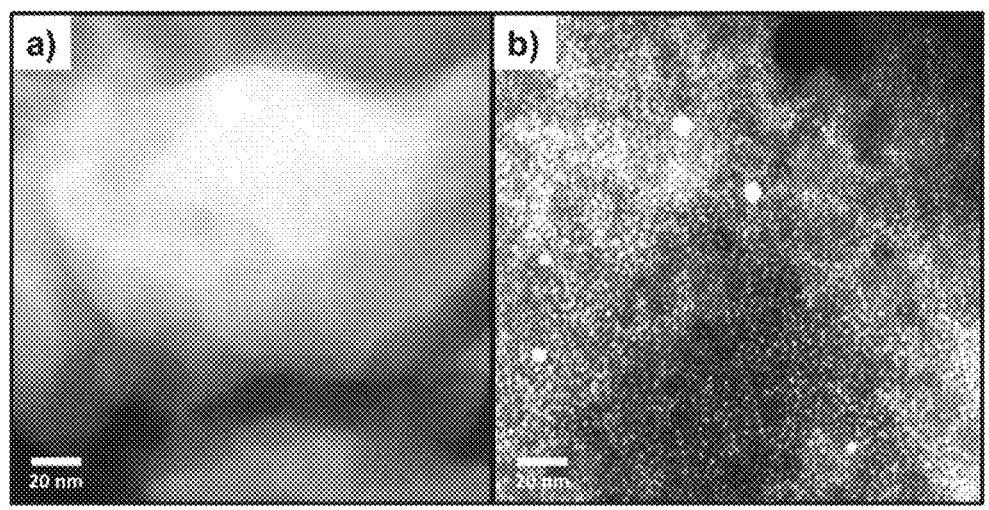
FIG. 4 shows TEM images of (a) one-step Pt-DPTZ/ MgO, showing the absence of Pt nanoparticles, and (b) $H_2$-reduced Pt/MgO, showing the appearance MgO-supported Pt nanoparticles.
Figure 5:
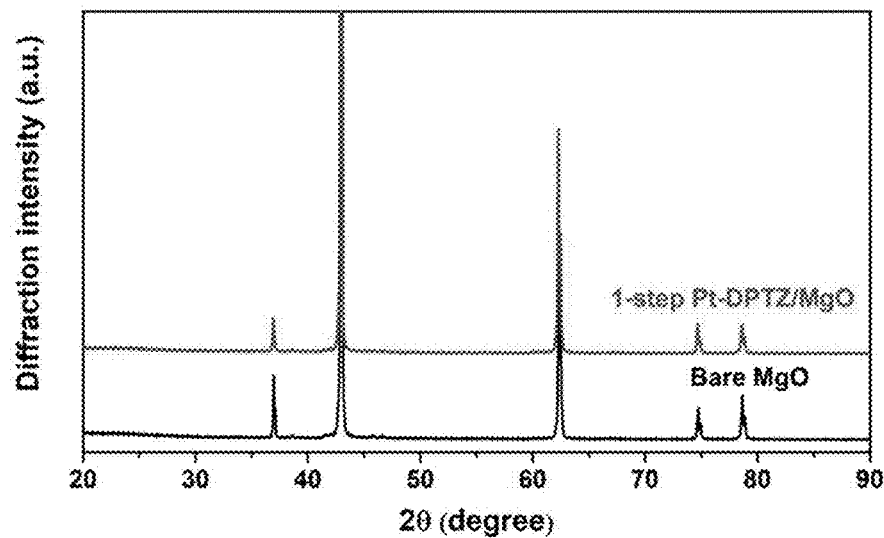
FIG. 5 provides XRD pattern of one-step Pt-DPTZ/MgO (red) and bare MgO (black), showing identical diffraction patterns. No Pt diffraction peaks are observed (compare to FIG. S12), suggesting the absence of crystalline Pt phase on one-step Pt-DPTZ/MgO.

TEM images of 1-step Pt-DPTZ/MgO do not show any observable Pt nanoparticles (FIG. 4a), as are observed for $H_2$-reduced Pt/MgO (FIG. 4b). No XRD peaks associated with a Pt crystalline phase are observed for one-step Pt-DPTZ/MgO (FIG. 5). CO adsorption DRIFTS on one-step Pt-DPTZ/MgO yielded no obvious C—O vibration peak from Pt(O)—$CO_{ads}$ species (2096 cm$^{-1}$, see FIG. S9) as Pt nanoparticles, confirming that there are few, if any, Pt nanoparticles.

The ratio between Pt-DPTZ single-sites and Pt nanoparticles is sensitive to solvent evaporation conditions. Performing solvent evaporation for one-step Pt-DPTZ/MgO at 100° C. instead of room temperature reduces DPTZ loading (from 0.94 to 0.62) and the fraction of Pt-DPTZ single sites significantly (from 90% to 64%, Table 2). The higher temperature results in a faster evaporation rate, so Pt atoms have a less uniform distribution and a higher chance of local oversaturation, producing some Pt nanoparticles.

TABLE 1

Figure 3:
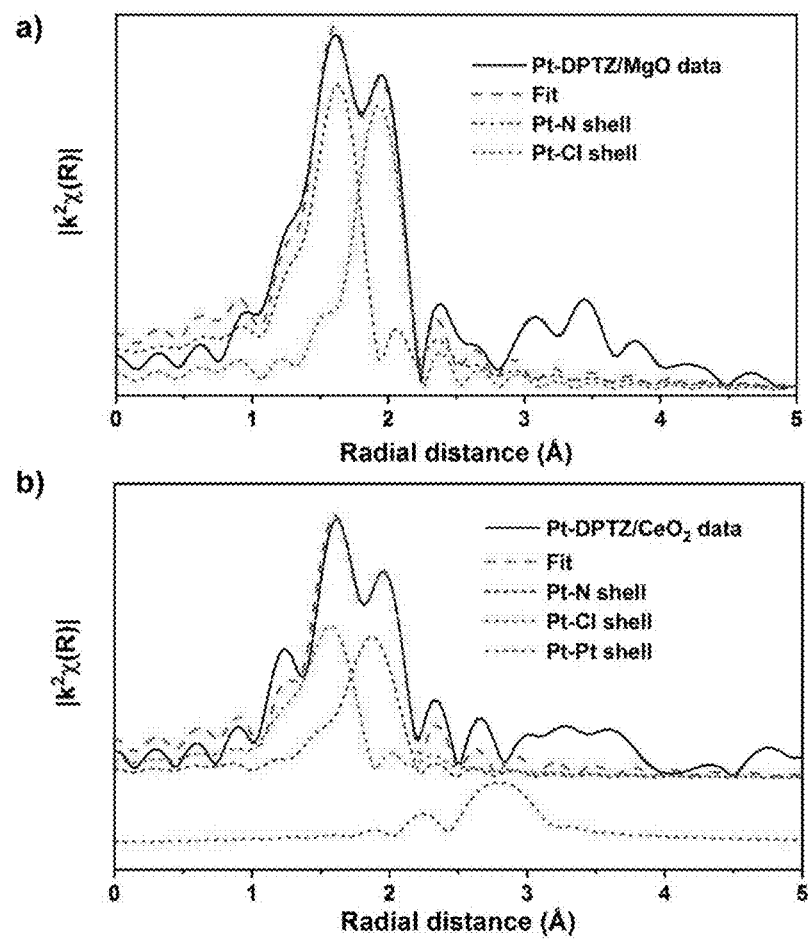
FIG. 3 provides Fourier transform magnitudes of EXAFS spectra (in R-space) and its first-shell fitting of (a) one-step Pt-DPTZ/MgO and (b) one-step Pt-DPTZ/$CeO_2$. The fitting shown in the graph was obtained using Pt—N and Pt—Cl paths, assuming N(Pt—Cl)=1.6 (MgO) or 1.4 ($CeO_2$), and $S_o^2$=0.8. The Pt—Pt path is not included in the fitting, but is shown in (b) for comparison. Values for independent fitting parameters are listed in Table 1. K-space plots are shown in FIGS. S7 and S10.

Values of fitting parameters of EXAFS spectra shown in FIG. 3 with one standard deviation given in parentheses.

| Fitting parameter | Pt-DPTZ/MgO | Pt-DPTZ/CeO$_2$ |
|---|---|---|
| $\Delta E_o$/eV | 9 (1) | 9 (2) |
| N(Pt—N/O) | 3.3 (0.4) | 3.4 (0.6) |
| $\sigma^2$(Pt—N/O)/10$^{-3}$ | 2 (1) | 1 (1) |
| $\sigma^2$(Pt—Cl)/10$^{-3}$ | 1.5 (0.8) | 0.5 (1) |
| R(Pt—N/O)/Å | 2.01 (0.01) | 2.01 (0.01) |
| R(Pt—Cl)/Å | 2.30 (0.01) | 2.28 (0.01) |

Numbers in brackets represent standard deviations of fitting values

The Fourier transform magnitude of the EXAFS spectrum of one-step Pt-DPTZ/MgO is reproduced in black in FIG. 3a, along with fitting to the first shell (R<2.21 Å) shown in red (see FIG. S7 for the k-space spectrum). This fit model includes Pt—N/O and Pt—Cl paths, which contribute to the R=1.62 Å and 1.96 Å features, respectively. Control experiments have shown that Cl does not stick to MgO without binding with Pt (see Table S1). Therefore, in the fitting shown in FIG. 3a, N(Pt—Cl) was set to 1.6 according to XPS data. Values of independent parameters in the fitting are listed in Table 1. R(Pt—N/O)=2.01 Å is between the Pt—N distance (1.996 Å) and Pt—O distance (2.070 Å for $PtO_2$,

TABLE 2

Summary of DPTZ loading, amount of residual Cl, and distribution of Pt oxidation states with various synthesis methods, supports, and solvent evaporation conditions

| Support | Method | Evaporation condition | DPTZ:Pt (DPTZ loading) | Cl:Pt | Pt oxidation states** | | |
|---|---|---|---|---|---|---|---|
| | | | | | 0 | +2 | +4 |
| MgO | one-step | 25° C. | 0.94 | 1.59 | 0.1 | 0.9 | — |
| | one-step | 100° C. | 0.66 | 2.18 | 0.4 | 0.6 | — |
| | two-step* | 100° C. | 0.09 | 0 | — | 0.2 | 0.8 |
| Al2O3 | one-step | 25° C. | 0.41 | 3.34 | 0.3 | 0.7 | — |
| | two-step* | 100° C. | 0.62 | 0 | 0.6 | 0.2 | 0.2 |
| CeO$_2$ | one-step | 25° C. | 0.42 | 1.37 | — | 0.9 | 0.1 |
| | two-step* | 100° C. | 0.24 | 0.64 | — | 0.9 | 0.1 |

*All two-step samples were calcined at 400° C. after the first step.
**Pt oxidation state fractions are based on fitting results of Pt 4f (MgO and CeO$_2$) or Pt 4d XPS (Al$_2$O$_3$) peaks.

Single-Site Pt-DPTZ on $Al_2O_3$ and $CeO_2$: Impact of Support Surface Properties One-step synthesis of Pt-DPTZ single-sites was also attempted on powdered $Al_2O_3$ and $CeO_2$. In each case, 1% (by weight) Pt was used in the synthesis, but the actual Pt loading on the catalyst (measured by ICP-MS after rinsing)

is significantly lower: 0.7% on $Al_2O_3$ and 0.35% on $CeO_2$. As mentioned above regarding the MgO support, this indicates the impact of DPTZ in the synthesis. The higher loading on $Al_2O_3$ relative to MgO or $CeO_2$ can be attributed to the much higher BET surface area (195 $m^2/g$ vs. ~5 $m^2/g$ for the other two). On $Al_2O_3$, DPTZ does not stick to the surface when deposited alone, and when Pt and DPTZ are impregnated simultaneously, XPS results show Pt(II) and Pt(0) features, similar to MgO, though with lower DPTZ loadings and higher Cl ratio (Table 2). It has been reported that impregnating Pt solely onto $Al_2O_3$ leads to support-anchored ions, Pt(IV) and metallic nanoparticles, Pt(0) [56, 57]. The absence of Pt(IV) in one-step Pt-DPTZ/$Al_2O_3$ indicates that DPTZ interferes with direct bonding of Pt to the support. Lower DPTZ loading (0.41) and Pt(II) fraction (0.7) on $Al_2O_3$ than on MgO provides that Pt atoms have a stronger tendency to form Pt nanoparticles instead of Pt-DPTZ single-sites.

An advantage of MgO over $Al_2O_3$ as supports for single-sites is attributed to the support-ligand interaction. As a basic support, MgO (pZC=12.4) attracts DPTZ more than $Al_2O_3$ (pZC=8.2) through the interaction between basic surface oxygen and acidic tetrazine rings [76]. Solvent evaporation at 100° C. is able to completely remove uncomplexed DPTZ from $Al_2O_3$ surface (no DPTZ pink color on pre-wash dry samples), but not from MgO surface (washing with DCM required to remove pink color). Thus, in solution, each DPTZ molecule has a longer residence time on MgO than on $Al_2O_3$ and Pt atoms have a higher chance to be captured as single-sites. Also, it has been reported that N-containing heterocyclic molecules similar to DPTZ coordinate strongly with $Al^{3+}$ Lewis acid sites on $Al_2O_3$[77-79]. Though this type of support-ligand interaction also helps increase DPTZ coverage, it competes with Pt-DPTZ binding, as $Al^{3+}$ occupies the nitrogen binding pocket. On MgO, the DPTZ-$Mg^{2+}$ interaction is weaker than DPTZ-$Al^{3+}$ on $Al_2O_3$[80].

On $CeO_2$, the same one-step method yields 88% Pt(II) and 12% Pt(IV) in XPS, but a DPTZ loading of 0.42, which indicates that not all of the Pt(II) is coordinated to DPTZ. When Pt is deposited on $CeO_2$ without DPTZ, the Pt 4f binding energy measured by XPS is consistent with a +2 formal oxidation state (FIG. S11a), consistent with prior studies [81-84]. $CeO_2$ is known for strong metal-support interaction (SMSI), for supporting Pt nanoparticles with small size, and for partially covered Pt nanoparticles by a $CeO_2$ shell [85, 86]. EXAFS of one-step Pt-DPTZ/$CeO_2$ are fit well by Pt—N (and Pt—O) and Pt—Cl paths (FIG. 3b; N(Pt—Cl) was again set to XPS value 1.4), indicating Pt-DPTZ coordination and/or Pt—$CeO_2$ interaction. The total coordination number of Pt is 4.8, similar with on MgO. There is a slight residual intensity at R=2.67 Å (FIG. 3b), which may indicate some contribution from Pt—Pt. $CeO_2$ attracts DPTZ more strongly than MgO; DPTZ is observed in XPS to stick to $CeO_2$ without the presence of Pt (FIG. S11b). Nonetheless, the main interaction between $CeO_2$ and DPTZ likely occurs between tetrazine N and $Ce^{3+}$ at oxygen vacancies. The presence of Pt(IV) on $CeO_2$ (12% of all Pt) is likely a result of Pt trapping at oxygen vacancies.

Two-Step Synthesis: An Alternative Method

The two-step self-assembly method to create single-sites on oxide supports has a wider range of application than the one-step method, as it does not require simultaneous dissolution of both metal precursor and ligand in a single solvent, which might be difficult for some systems. Also, residual Cl can be completely removed by high-temperature calcination after the first step. Calcination is not possible for the one-step method, as most ligands are susceptible to decomposition at elevated temperature.

Figure 6:
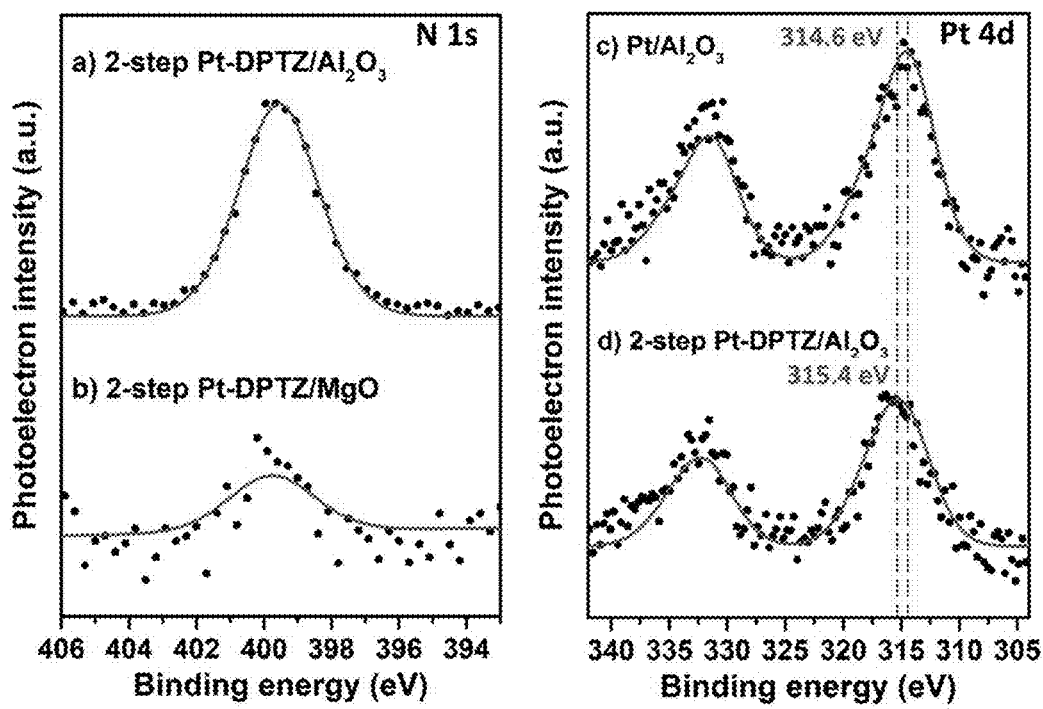
FIG. 6 provides XP spectra of (a) two-step Pt-DPTZ/ $Al_2O_3$, N is region; (b) two-step Pt-DPTZ/MgO, N 1s region; c) Pt/$Al_2O_3$, Pt 4d region; d) two-step Pt-DPTZ/ $Al_2O_3$, Pt 4d region. A peak shift toward higher BE (~0.8 eV) after DPTZ deposition is observed by comparing (c) and (d). The Pt/$Al_2O_3$ sample shown in (c) was calcined at 400° C., and the sample shown in (d) was synthesized from it. Pt 4d instead of 4f region was used for all $Al_2O_3$-supported sample because the complete overlapping between Al 2p and Pt 4f peak.
Figure 7:
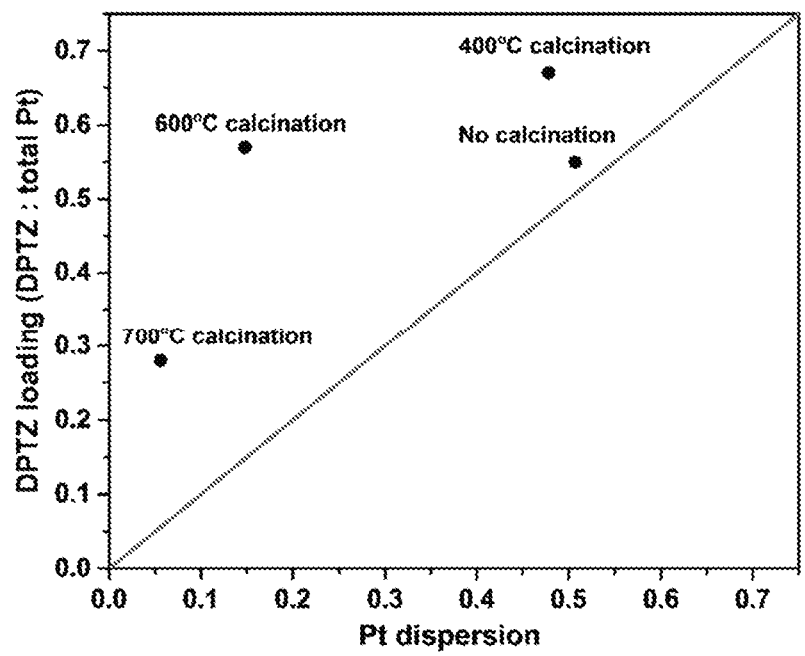
FIG. 7 depicts a comparison between DPTZ loading of two-step Pt-DPTZ/$Al_2O_3$ and Pt dispersion after the first step. Pt dispersion was varied by changing calcination temperature of Pt/$Al_2O_3$ and measured by $H_2$—$O_2$ titration method. The red curve represents situations where DPTZ loading equals Pt dispersion (each surface Pt binds with one DPTZ). All data points are above the red curve, suggesting that there are more DPTZ molecules than surface Pt atoms, so Pt-DPTZ single-sites are formed.
Figure 8:
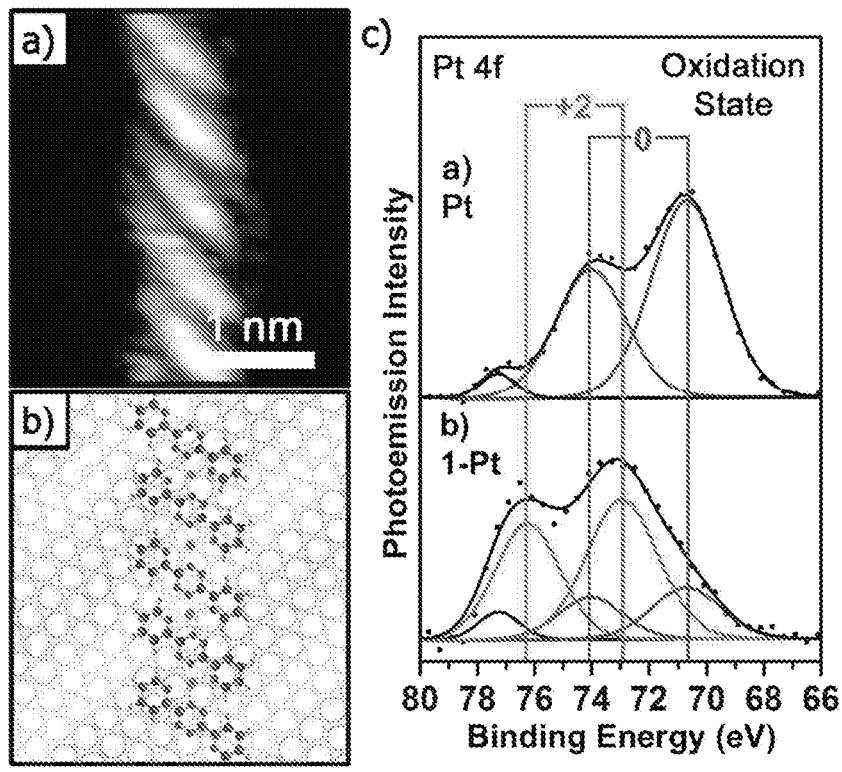
Figure 9:
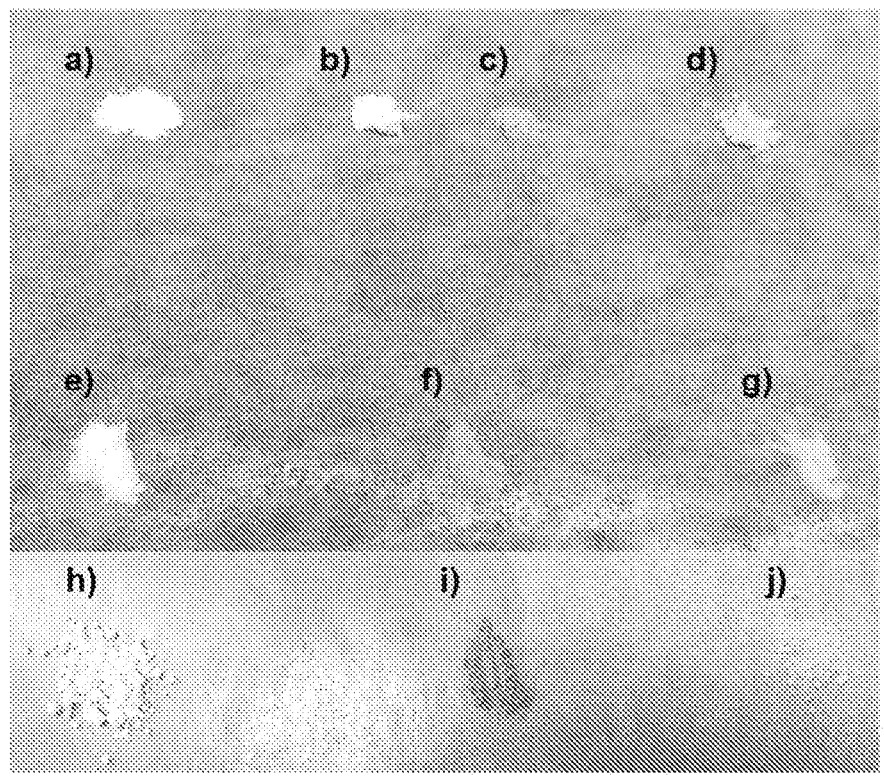
Figure 10:
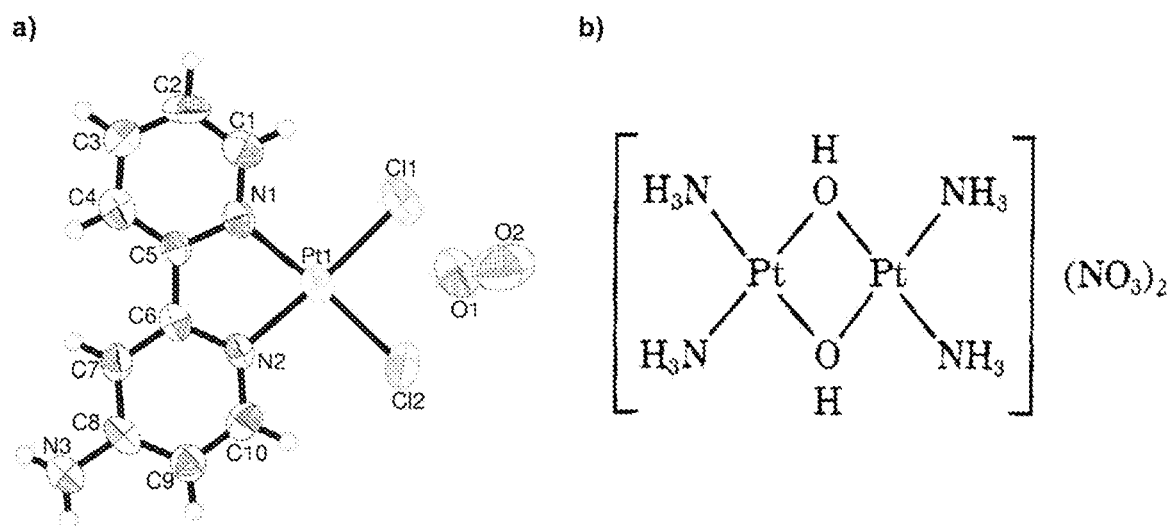
Figure 11:
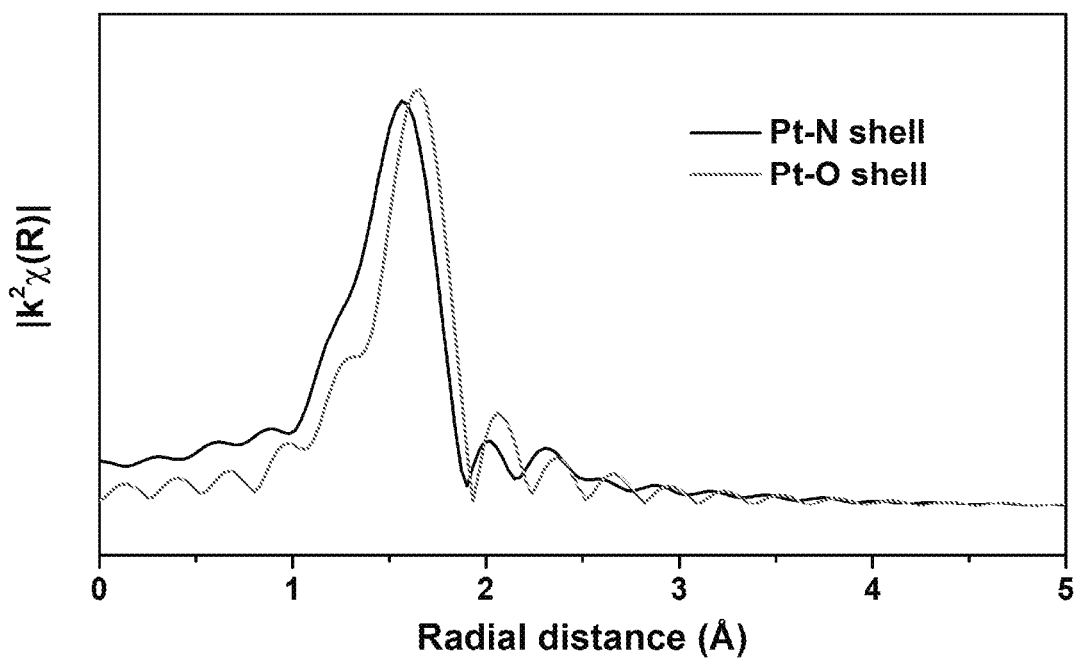
Figure 12:
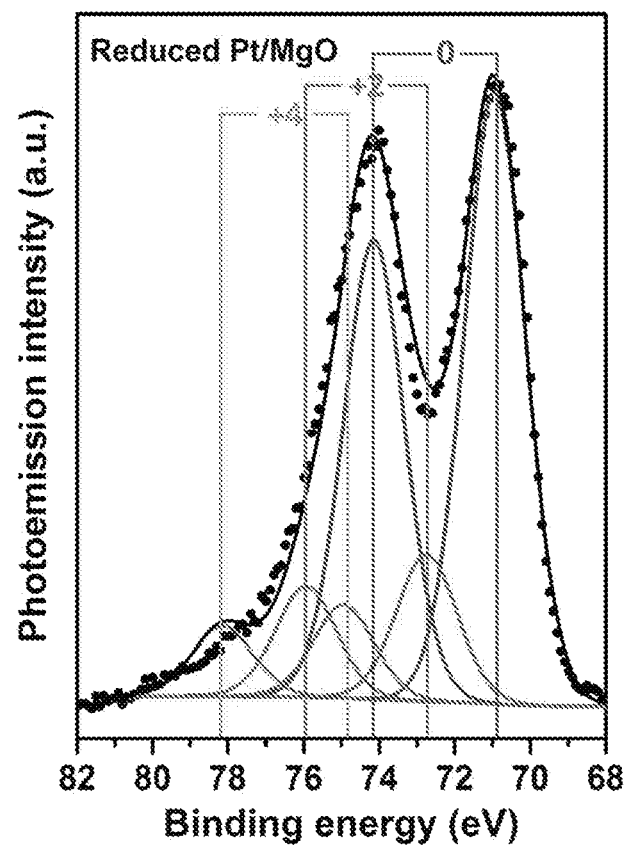

The two-step method yields a significantly higher DPTZ loading on $Al_2O_3$ than on MgO (DPTZ:Pt number ratio of 0.66 and 0.09, respectively, Table 2), as measured by XPS (FIGS. 6a and 6b). This can be attributed to structural and valence state differences in the Pt on MgO or $Al_2O_3$. On MgO, the formation of $Mg_2PtO_4$ phase with Pt in the +4 oxidation state (FIG. 1c) is strongly favored when impregnating Pt in the first step. Pt(IV) centers are incorporated into the MgO lattice, which significantly reduces their access to DPTZ in the second step, and their +4 oxidation state makes them unattractive redox partners for the DPTZ. Consequently, Pt-DPTZ coordination on MgO is difficult, and DPTZ loading is low. On $Al_2O_3$, the Pt $4d_{5/2}$ XPS peak position after Pt loading in the first step and 400° C. calcination (FIG. 6c) is 314.6 eV, which is close to the BE of Pt(0) (~314.0 eV). Therefore, after the first step on $Al_2O_3$, most Pt exist as small metallic nanoparticles in a zero oxidation state, in which surface Pt atoms can interact with DPTZ easily, leading to a higher DPTZ loading. Prior UHV studies also showed that DPTZ can utilize Pt from zero valent metal nanoparticles.[14] There is a significant surface area difference between these two oxide supports, but in the absence of Pt, DPTZ does not stick to MgO or $Al_2O_3$(FIG. 1a), so the difference in DPTZ:Pt loading ratio is not directly related to this surface area difference. After two-step DPTZ impregnation on $Al_2O_3$, the BE of Pt $4d_{5/2}$ XPS peak shifts 0.8 eV higher (FIG. 6d), which originates from electron transfer from Pt to DPTZ. This shift is not observed on MgO due to extremely low DPTZ loading. The Pt to DPTZ charge transfer on $Al_2O_3$ is further supported by the N 1s XPS peak shape in FIG. 6a being more similar to reduced DPTZ (single component) than to bulk DPTZ (double component peak, FIG. S6).[14] Regardless of Pt nanoparticle size after the first step (varied by calcination temperature), DPTZ loading is higher than Pt dispersion (FIG. 7), indicating that some Pt atoms have been etched from nanoparticles to form Pt-DPTZ single-sites on $Al_2O_3$.

Despite the formation of some single-site Pt on $Al_2O_3$ with the two-step method, Pt nanoparticles also exist, as observed by Pt crystallite peaks in XRD measurements (FIG. S12). The Pt $4d_{5/2}$ BE of two-step Pt-DPTZ/$Al_2O_3$ is 315.4 eV (FIG. 6d), which is still lower than Pt(II) (316.5 eV), indicating the presence of some Pt(0) species. The calcination temperature following the first step has a strong impact on DPTZ loading: 400° C. yielded higher DPTZ loading (0.66 than 700° C. calcination (0.28). Without calcination, much of the Cl is not removed from the Pt precursor (Cl:Pt=0.90) and interferes with DPTZ loading (0.54). Increased stirring times (up to 5 days) or higher DPTZ concentrations (up to 10 eq. with Pt) in the second step do not increase DPTZ loading.

In contrast, in previous Au(100) single crystal studies, the formation of Pt-DPTZ single-sites from Pt island was more complete, as almost all Pt(0) was converted into Pt(II), and the DPTZ loading is close to 1 [14, 44, 45]. The comparison between it and the present embodiments reveals important differences between powdered oxide supports and metal single crystals as supports for metal-ligand single-sites. The surface roughness of powdered $Al_2O_3$ significantly limits the mobility of Pt atoms and DPTZ molecules. However, the synthesis in solution offers opportunities for mobility via solution. It is possible that the single-site formation actually occurs in solution: DPTZ etches off Pt to form single-sites complexes, which diffuse in solution, self-assemble, and eventually re-adsorb onto the support surface. Some sites on oxide supports may interact with Pt more strongly than metal single crystals. On MgO, Pt atoms react with the support surface to form $Mg_2PtO_4$ phase, impeding the formation of Pt-DPTZ single-sites. On $Al_2O_3$, even if Pt does not form mixed oxide, it has been reported to form support-anchored Pt(IV) [56, 57]. The +4 oxidation state implies that these Pt atoms barely have any coordination vacancies. Therefore, they are not likely to be reactive towards DPTZ. The support-metal binding also further limits Pt mobility on the surface. The negative impact of support-metal interaction on powdered oxides is more obvious on $CeO_2$, where the two-step method yields 0.24 DPTZ loading (Table 2). Support-anchored Pt(IV) is clearly observed, and most Pt atoms exist in small Pt clusters stabilized by strong metal-support interaction, which has a formal oxidation state of +2 in XPS. Strong metal-support interaction between Pt and $CeO_2$ even leads to Pt clusters partially covered by $CeO_2$, significantly limiting their accessibility to DPTZ.

Single-site Pt-DPTZ can also be created by the two-step method on $Al_2O_3$ and $CeO_2$. However, on powdered oxide supports, it suffers from the low Pt accessibility and mobility, so not all Pt(0) can be dissolved from nanoparticles and complexed into single-sites. Therefore, the two-step method is not as effective as the one-step in creating Pt-PDTZ single-sites on real catalyst supports, and can serve as an alternative method when the one-step method is not applicable due to concerns with solubility, or Cl removal.

Catalytic performance of oxide-supported Pt-DPTZ SSCs in hydrosilylation reactions Catalytic performances of oxide-supported Pt-DPTZ single-sites were evaluated in a hydrosilylation reaction between 1-octene and dimethoxymethysilane (Scheme 2). Pt-DPTZ single-sites were synthesized with the one-step method because of their structures are more uniform than with the two-step method. Performances of these Pt-DPTZ single-site catalysts (SSCs) and their comparisons with two commercial catalysts (Speier catalyst, $H_2PtCl_6$ in isopropanol [68], and Karstedt catalyst [87], see FIG. S13a) are exhibited in Table 3. The yield achieved with Karstedt catalyst is close to values in previous literature under similar conditions [88, 89]. Despite a lack of literature results regarding catalyzing the same reaction with Speier catalyst, similar by-products and side reactions were detected as reported with slightly different substrates [69]. It should be noted that all reactions were conducted with 1.2 eq. of 1-octene due to concerns of C=C isomerization and hydrogenation side reactions [88, 90, 91], so the product yield values were calculated based on the silane reactant. Table 3 shows that all SSCs offer satisfactory activity and selectivity in this reaction. 100% silane conversion can be achieved under mild conditions (75° C., 2 h on Pt-DPTZ/MgO, and 70° C., 20 min on Pt-DPTZ/$CeO_2$ and Pt-DPTZ/$Al_2O_3$). The GC yield of the product is 95% on Pt-DPTZ/MgO (entry 1), 90% on Pt-DPTZ/$CeO_2$ (entry 3), and 85% on Pt-DPTZ/$Al_2O_3$ (entry 4) at 100% silane conversion, with little Si-containing byproducts (mainly silane dimers) formed. Both Pt-DPTZ/MgO and Pt-DPTZ/$CeO_2$ exhibit improved selectivity (higher yield at 100% silane conversion) compared with two commercial catalysts under the same condition (entry 5 and 6). At 70° C., one-step Pt-DPTZ/MgO offers higher selectivity than Pt-DPTZ/$CeO_2$ and Pt-DPTZ/$Al_2O_3$, potentially due to its more uniform single-site structure. Silane conversion is lower on MgO (Table 3, 68% after 30 min compared with 100% after 20 min on $CeO_2$ and $Al_2O_3$), and turnover is also slower than on $CeO_2$ (TOF=8.6 s$^{-1}$ compared with >12.5 s$^{-1}$).

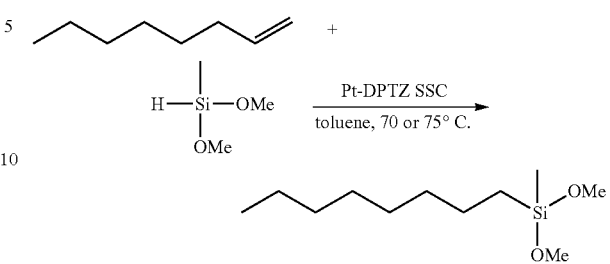

Scheme 2. Hydrosilylation reaction between 1-octene and dimethoxymethysilane with oxide-supported Pt-DPTZ SSCs tested.

Figure 13:
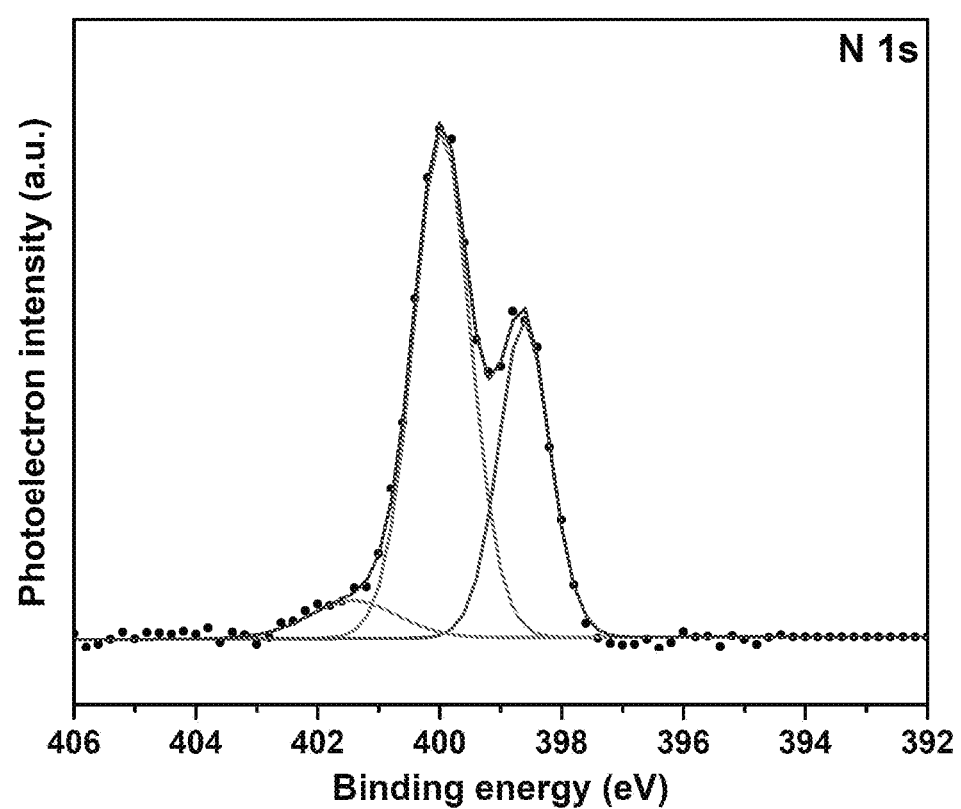
Figure 14:
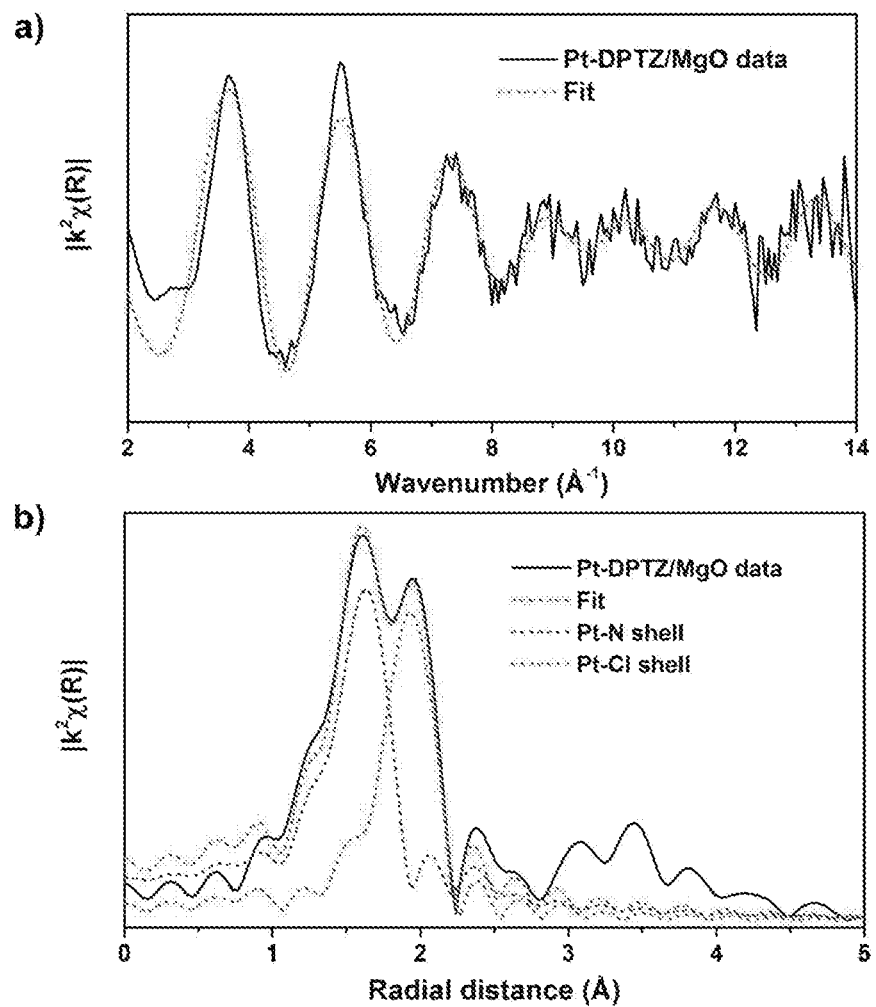
Figure 15:
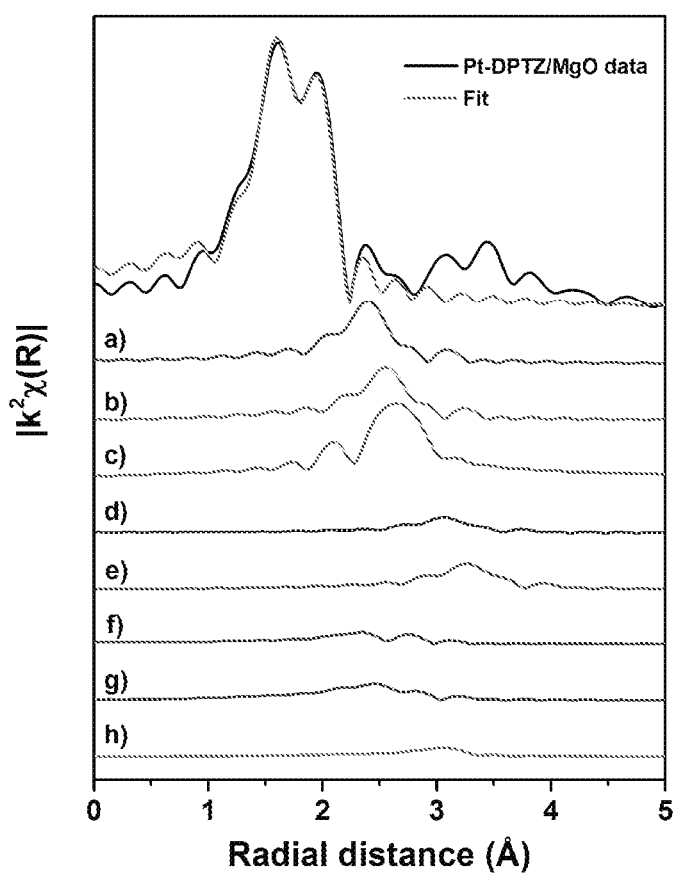
Figure 16:
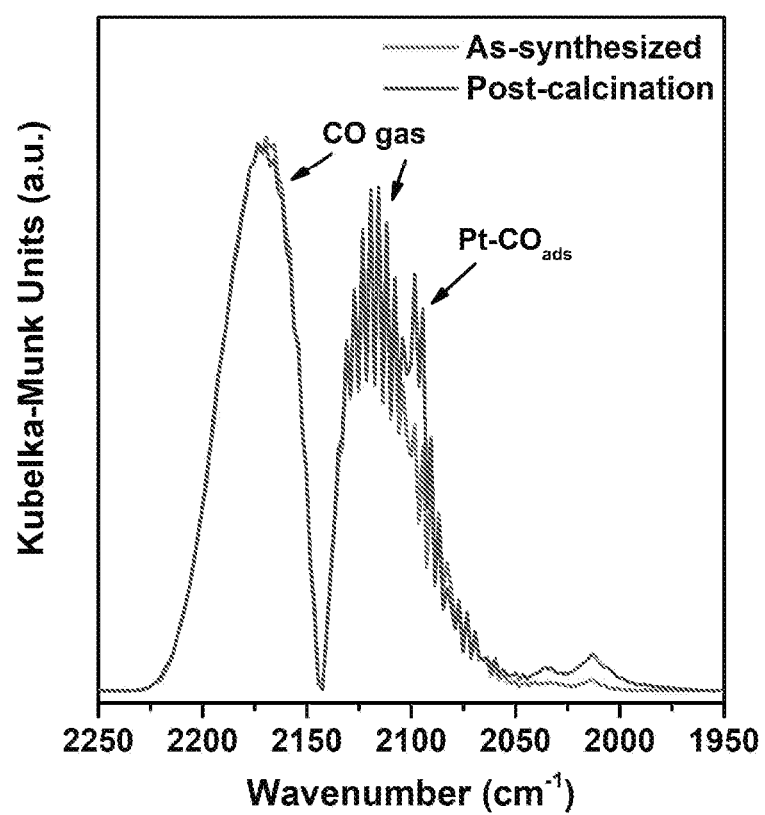
Figure 17:
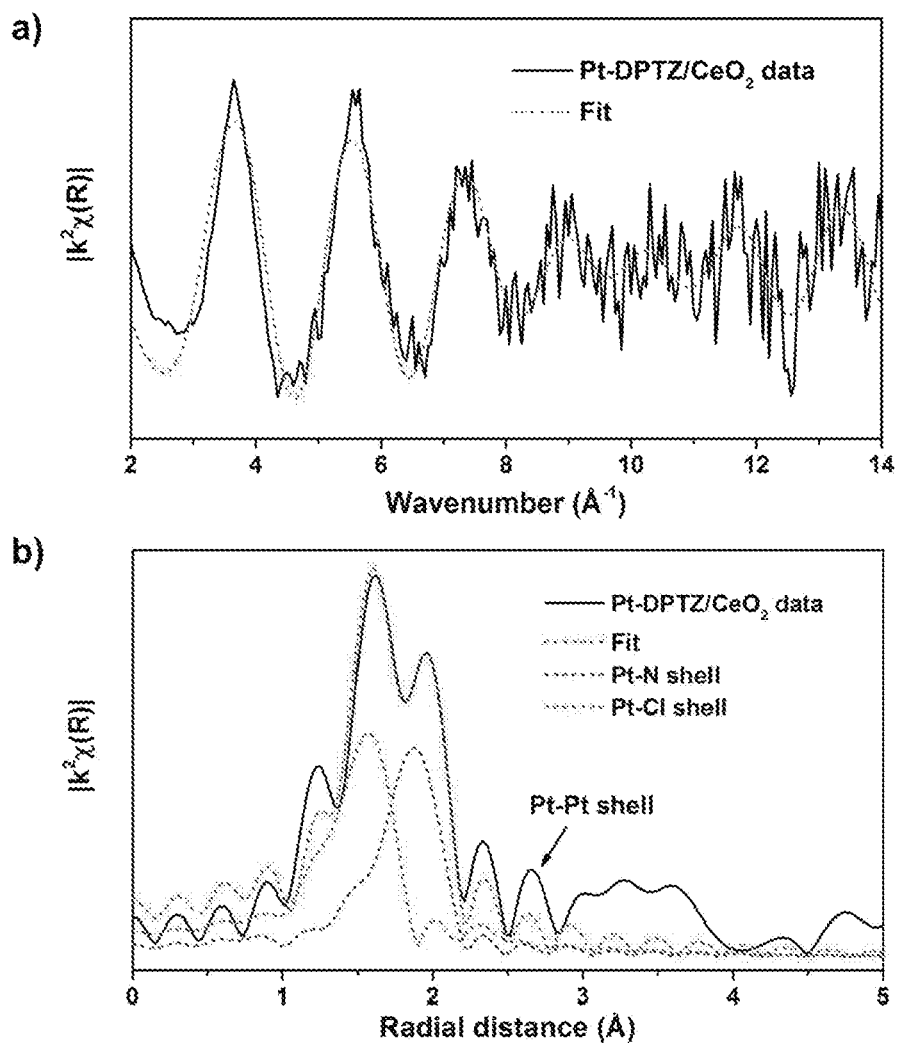
Figure 18:
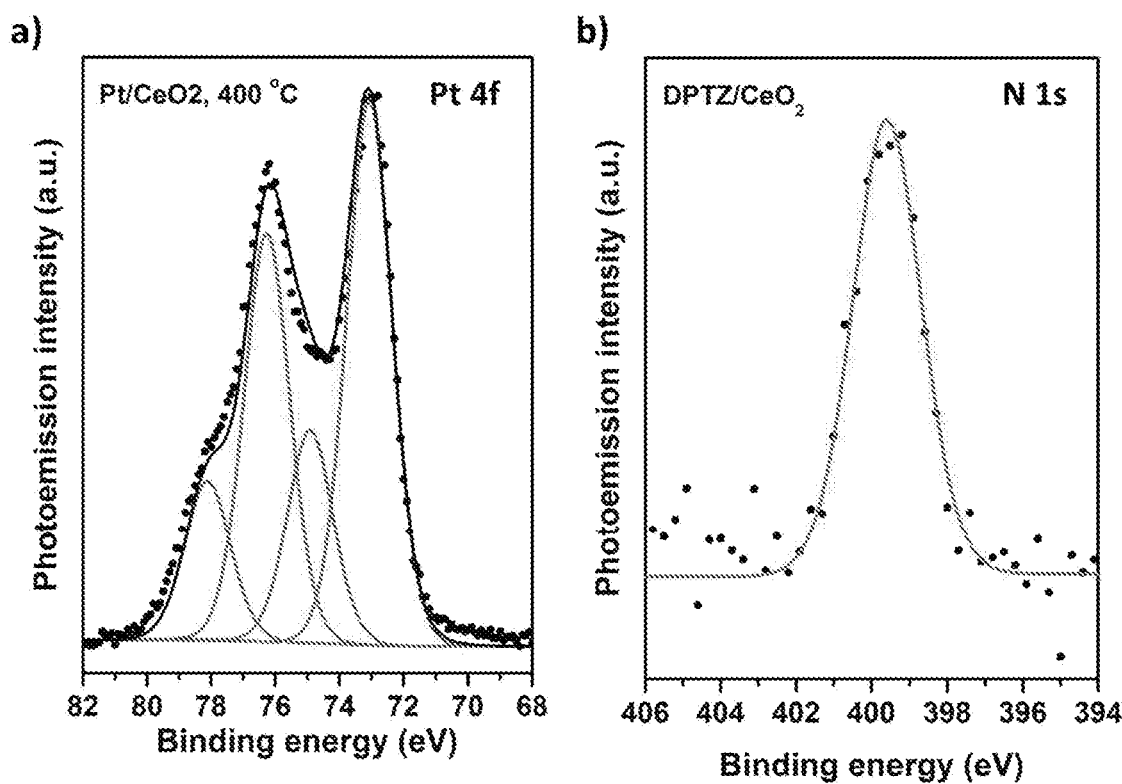
Figure 19:
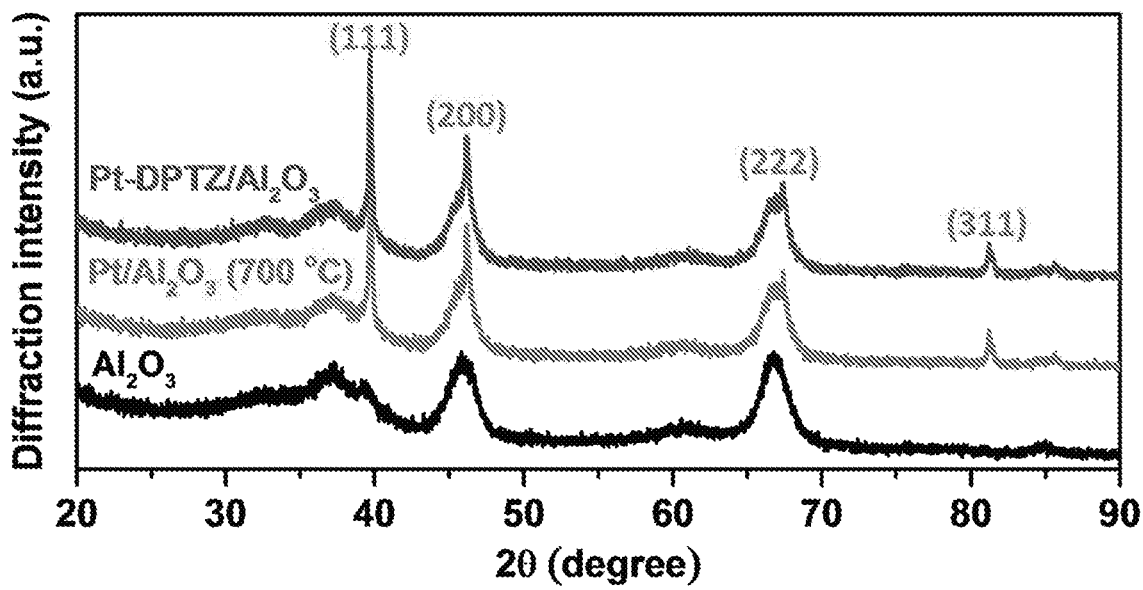
Figure 20:
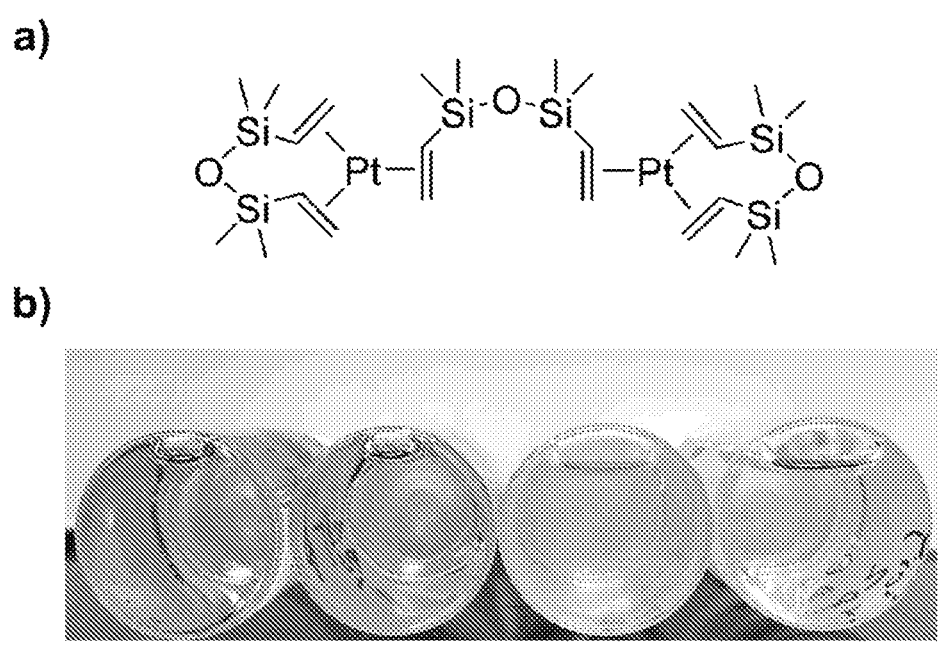

One main challenge in the hydrosilylation catalysis is to eliminate the formation of colloidal Pt(0) clusters, which does not lead to long-term deactivation of catalysts, but also catalyzes side reactions such as isomerization and hydrogenation of alkenes [88, 90, 91]. Table 3 exhibits that on all Pt-DPTZ SSCs tested, less formation of 2-octene (isomerization product) and octane (hydrogenation product) are observed than for commercial catalysts, indicating Pt-DPTZ SSCs are more selective in alkene conversion. Post-reaction solutions with both commercial catalysts exhibit obvious yellow color from colloidal Pt(0), while the color of the solution is significantly lighter after performing the reaction on Pt-DPTZ SSCs (FIG. 13b). It may be implied that less colloidal Pt(0) is formed with Pt-DPTZ SSCs, which is consistent with less alkene-related side reactions. The aggregation of Pt is harder with oxide-supported Pt-DPTZ SSCs because of strong coordination between Pt centers and N binding pockets, and limited mobility of Pt centers on oxide surfaces compared with in solution. The high activity and improved selectivity of Pt-DPTZ SSCs shown reveal their potentials as effective next-generation hydrosilylation catalysts.

TABLE 3

Catalytic performances of oxide-supported Pt-DPTZ SSCs and commercial homogeneous catalysts in hydrosilylation reactions.

| Entry | Catalyst | T (° C.) | t (min) | Product yield* (%) | 2-octene yield** (%) | Octane yield** (%) |
|---|---|---|---|---|---|---|
| 1 | Pt-DPTZ/MgO | 75 | 120 | 96 | 3 | 0 |
| 2 | Pt-DPTZ/MgO | 70 | 30 | 68 | 2 | 0 |
| 3 | Pt-DPTZ/$CeO_2$ | 70 | 20 | 91 | 4 | 1 |
| 4 | Pt-DPTZ/$Al_2O_3$ | 70 | 20 | 85 | 2 | 0 |
| 5 | Speier catalyst | 70 | 20 | 13 | 8 | 13 |
| 6 | Karstedt catalyst | 70 | 20 | 86 | 6 | 2 |

All SSCs were synthesized using the one-step method. All reactions were conducted with 2.5 mmol dimethoxymethylsilane and 3.0 mmol 1-octene in 1.5 mL toluene. The Pt concentration is 18 ppm for all entry 3-6 and 13 ppm for entry 1-2. For all experiments but entry 2, 100% silane conversion is reached. The silane conversion in entry 2 is lower than 75%. Full conversion and yield are reached in entry 3, so the TOF value calculated from this experiment is its lower limit.

*Product yield values were based on the reactant silane due to excess amount of 1-octene used.

**2-octene and octane yield values were based on 1-octene.

TABLE S4

First-shell EXAFS fitting results of one-step Pt-DPTZ/MgO

| N(Pt—N/O) (total CN) | $S_o^2$ | $\Delta E_o$ (eV) | Pt—N/O shell | | Pt—Cl shell | | Reduced $\chi^2$ |
|---|---|---|---|---|---|---|---|
| | | | R (Å) | $\sigma^2$ ($10^{-3}$) | R (Å) | $\sigma^2$ ($10^{-3}$) | |
| 1.9 (3.5) | 1.12 (0.08) | 9 (1) | 2.00 (0.01) | 1 (1) | 2.29 (0.01) | 4.5 (0.9) | 26 |
| 2.4 (4.0) | 0.98 (0.08) | 9 (1) | 2.01 (0.01) | 2 (1) | 2.30 (0.01) | 3 (1) | 29 |
| 2.9 (4.5) | 0.87 (0.04) | 9 (1) | 2.01 (0.01) | 2 (1) | 2.30 (0.01) | 2 (1) | 32 |
| 3.4 (5.0) | 0.79 (0.07) | 10 (1) | 2.02 (0.01) | 2 (1) | 2.31 (0.01) | 1 (1) | 35 |
| 3.9 (5.5) | 0.72 (0.06) | 10 (1) | 2.02 (0.01) | 2 (1) | 2.31 (0.01) | 0.9 (1) | 39 |
| 4.4 (6.0) | 0.67 (0.06) | 11 (1) | 2.02 (0.01) | 3 (2) | 2.31 (0.01) | 0.5 (1) | 43 | assuming various geometry

All fittings covered 1 Å<R<2.21 Å (first shell). N(Pt—Cl) was fixed to 1.6 according to XPS data. N(Pt—N/O) was fixed to various values to represent different geometries. $S_o^2$, $\Delta E_o$, $\Delta R$(Pt—N/O), $\sigma^2$(Pt—N/O), $\Delta R$(Pt—Cl), and $\sigma^2$(Pt—Cl) were set as independent fitting parameters. Except for the first column, values in brackets represents standard deviations of the parameters.

Table S1 shows fitting parameters obtained when assuming various Pt CN. In these fittings, N(Pt—N/O) was fixed to various values to represent Pt geometry, and $S_o^2$ was set as an independent parameter. Pt—N path was used to represent the Pt—N/O path. These results provide that Pt atoms likely stay in square planar geometry (CN=4~5), as fitting attempt assuming tetrahedral geometry (CN=6) yields parameters that is physically unreasonable. For the CN=6 fitting, $\sigma^2$ of Pt—Cl is very small (0.0005) for a typical first shell, and is much smaller than $\sigma^2$ Pt—N/O shell (0.003). These values provide the Pt—Cl bond needs to be extremely strong and much stronger than Pt—N/O bonds, which is unphysical. Besides, $S_o^2$ value becomes too small (<0.7) for a sample that is not concentrated enough for absorption, and $\Delta E_o$ is above 10 eV. Actually, the 2 of Pt—Cl and Pt—N/O in the CN=5.5 fitting already seems unreasonable considering Pt—Cl bond is longer than Pt—N/O. Although each fitting listed in Table S1 appears similar when plotted, the quality of the fit (as quantified by reduced $\chi^2$) becomes worse with increasing Pt CN. Fitting with CN=3.5 yields a much smaller $\sigma^2$ for Pt—N/O (0.001) than Pt—Cl (0.004) and $S_0^2$>1, which is suspicious as well. The comparison between different models provide the average CN of Pt is most likely between 4 and 5.

To justify the decision to restrain N(Pt—Cl) in EXAFS fittings to the XPS Cl:Pt value, the following evidence supports that all Cl atoms bind with Pt, not oxide supports (MgO or $CeO_2$) themselves. In separate experiments, the synthesis of Fe-DPTZ single-sites on MgO and $CeO_2$ was attempted. The procedure performed is identical with the one-step method described herein, a difference being Cl-containing Fe precursor $FeCl_2$ was used instead of Pt precursor $H_2PtCl_6 \cdot 6H_2O$. XPS results on one-step Fe-DPTZ/MgO and Fe-DPTZ/$CeO_2$ both show absence of Cl. This suggests that Cl cannot bind with MgO or $CeO_2$ when not coordinated with metal. In the Pt case, all Cl atoms are residual from Pt precursor that coordinate with Pt. In the Fe case, strong affinity between Fe and O drives the formation of $FeO_x$ clusters, so Cl from Fe precursor is completely replaced and hence absent.

TABLE S5

First-shell EXAFS fitting results of one-step Pt-DPTZ/MgO using various N(Pt—Cl) and Pt—N or Pt—O path to represent the Pt—N/O path

| | $\Delta E_o$ (eV) | Pt—N/O | | | Pt—Cl | | Pt CN |
|---|---|---|---|---|---|---|---|
| | | N | R (Å) | $\sigma^2$ ($10^{-3}$) | R (Å) | $\sigma^2$ ($10^{-3}$) | |
| N(Pt—Cl) = 1.6, Pt—N | 9 (1) | 3.3 (0.4) | 2.01 (0.01) | 2 (1) | 2.30 (0.01) | 1.5 (0.8) | 4.9 (0.4) |
| N(Pt—Cl) = 1.6, Pt—O | 8.8 (0.8) | 2.6 (0.2) | 1.990 (0.008) | 2 (1) | 2.298 (0.008) | 2.0 (0.6) | 4.2 (0.2) |
| N(Pt—Cl) = 1.3, Pt—N | 10 (1) | 3.6 (0.5) | 2.02 (0.01) | 3 (2) | 2.30 (0.01) | 0.4 (0.8) | 4.9 (0.5) |
| N(Pt—Cl) = 1.3, Pt—O | 9.4 (0.7) | 2.9 (0.2) | 1.999 (0.008) | 3 (1) | 2.302 (0.007) | 0.9 (0.6) | 4.2 (0.2) |
| N(Pt—Cl) = 1.1, Pt—N | 11 (1) | 3.9 (0.6) | 2.02 (0.01) | 3 (2) | 2.31 (0.01) | 0.4 (0.9) | 5.0 (0.6) |
| N(Pt—Cl) = 1.1, Pt—O | 9.8 (0.8) | 3.1 (0.2) | 2.004 (0.008) | 3 (1) | 2.315 (0.007) | 0.1 (0.6) | 4.2 (0.2) |

All fittings covered 1 Å<R<2.21 Å (first shell). N(Pt—Cl) was fixed to 1.1, 1.3, or 1.6. $S_o^2$ was fixed to 0.8 according to fitting results of $PtO_2$ and Pt foil standard samples measured at the same time. $\Delta E_o$, N(Pt—N/O), $\Delta R$(Pt—N/O), $\sigma^2$(Pt—N/O), $\Delta R$(Pt—Cl), and $\sigma^2$(Pt—Cl) were set as independent fitting parameters. Values in brackets represents standard deviations of the parameters.

Table S2 shows fitting parameters obtained when using various Cl:Pt ratios and Pt—N or Pt—O paths to represent the Pt—N/O path. All fittings listed in the table are visually similar with FIG. 3. When using Pt—N path to represent the Pt—N/O path, the total Pt CN is 4.9, regardless of N(Pt—Cl). R(Pt—N/O) and R(Pt—Cl) are also similar. When assuming N(Pt—Cl)=1.3 or 1.1, $\sigma^2$(Pt—Cl) becomes suspiciously small (<0.001), and hence, these fittings are worse description of the system. Using Pt—O path instead of Pt—N produced a less total Pt CN (4.2 instead of 4.9). However, the value also supports that most Pt atoms are in square planar geometry with extra coordination with surface oxygen or on-top Cl. Again, bond lengths are not dependent on the choice of N(Pt—Cl), and assuming N(Pt—Cl)=1.3 or 1.1 yielded suspiciously small $\sigma^2$(Pt—Cl). Results are not affected by the choice of N(Pt—Cl), and which path is used to represent the Pt—N/O path. N(Pt—Cl)=1.6 is a better description of the system than smaller values, supporting the concept that all Cl cannot bind directly with oxide surfaces without interacting with Pt. Consideration was given to treat N(Pt—Cl) as an independent fitting parameters instead of using XPS values. However, that led to very large standard deviations in all fitting parameters. This is likely because with that strategy, 7 independent parameters were used in fittings (the maximum allowed by the software is 8), which yielded large standard deviations and thus unreliable fitting results. Besides, the N(Pt—Cl) obtained from that strategy was 2.6, which was higher than XPS Cl:Pt ratio and hence unreasonable. Restraining Pt CN to 4 (strict square planar geometry) reduces the number of independent parameters to 6, but it leads to negative $\sigma^2$.

Pt-DPTZ single-sites were created on high surface area catalyst support materials (MgO, $Al_2O_3$, and $CeO_2$) through metal-ligand self-assembly. A uniform structure, with 90% Pt as single-sites was obtained on MgO using the one-step impregnation method. Pt(II) single-sites are stabilized in the DPTZ binding pockets, so the formation of Pt nanoparticles or $Mg_2PtO_4$ is not favored. The proposed structure was supported by evidence from XPS, XAS, TEM, XRD, and CO adsorption measurements. Comparison between different supports reveals that the single-site formation is also feasible on other supports ($Al_2O_3$ and $CeO_2$). Strong, non-competitive support-ligand interactions favor single-site formation and strong metal-support interaction is undesired. The two-step impregnation is less effective because Pt atoms have low mobility and accessibility on powdered oxide supports. The embodiments described herein provide a new strategy to develop supported single-site catalysts that can potentially be applied in various metal-ligand systems. Catalytic studies with hydrosilylation reactions suggested these single-site centers exhibit satisfactory activity and improved selectivity over commercial homogeneous catalysts, with less undesired colloidal Pt(0) formation.

REFERENCES

[1] Z. Huang, X. Gu, Q. Cao, P. Hu, J. Hao, J. Li, X. Tang, Catalytically Active Single-Atom Sites Fabricated from Silver Particles, Angew. Chem., 124 (2012) 4274-4279.
[2] E. Fako, Z. Lodziana, N. Lopez, Comparative single atom heterogeneous catalysts (SAHCs) on different platforms: a theoretical approach, Catal. Sci. Tech., 7 (2017) 4285-4293.
[3] Y. X. Chen, Z. W. Huang, Z. Ma, J. M. Chen, X. F. Tang, Fabrication, characterization, and stability of supported single-atom catalysts, Catal. Sci. Tech., 7 (2017) 4250-4258.
[4] B. Qiao, A. Wang, X. Yang, L. F. Allard, Z. Jiang, Y. Cui, J. Liu, J. Li, T. Zhang, Single-atom catalysis of CO oxidation using Pt1/FeOx, Nature Chem., 3 (2011) 634-641.
[5] H. Sohn, J. Camacho-Bunquin, R. R. Langeslay, P. A. Ignacio-de Leon, J. Niklas, O. G. Poluektov, C. Liu, J. G. Connell, D. Yang, J. Kropf, H. Kim, P. C. Stair, M. Ferrandon, M. Delferro, Isolated, well-defined organovanadium(III) on silica: single-site catalyst for hydrogenation of alkenes and alkynes, Chem. Comm., 53 (2017) 7325-7328.
[6] C. A. Demmelmaier, R. E. White, J. A. van Bokhoven, S. L. Scott, Nature of SiOCrO2Cl and (≡SiO)2CrO2 Sites Prepared by Grafting CrO2Cl2 onto Silica, J. Phys. Chem. C, 112 (2008) 6439-6449.
[7] C. Tiozzo, C. Bisio, F. Carniato, A. Gallo, S. L. Scott, R. Psaro, M. Guidotti, Niobium-silica catalysts for the selective epoxidation of cyclic alkenes: the generation of the active site by grafting niobocene dichloride, Phys. Chem. Chem. Phys., 15 (2013) 13354-13362.
[8] L. Zhong, M.-Y. Lee, Z. Liu, Y.-J. Wanglee, B. Liu, S. L. Scott, Spectroscopic and structural characterization of Cr(II)/SiO$_2$ active site precursors in model Phillips polymerization catalysts, J. Catal., 293 (2012) 1-12.
[9] M. D. Marcinkowski, J. Liu, C. J. Murphy, M. L. Liriano, N. A. Wasio, F. R. Lucci, M. Flytzani-Stephanopoulos, E. C. H. Sykes, Selective formic acid dehydrogenation on Pt—Cu single-atom alloys, ACS Catal., 7 (2016) 413-420.
[10] F. R. Lucci, J. Liu, M. D. Marcinkowski, M. Yang, L. F. Allard, M. Flytzani-Stephanopoulos, E. C. H. Sykes, Selective hydrogenation of 1, 3-butadiene on platinum-copper alloys at the single-atom limit, Nature Comm., 6 (2015) 8550.
[11] P. Liu, Y. Zhao, R. Qin, S. Mo, G. Chen, L. Gu, D. M. Chevrier, P. Zhang, Q. Guo, D. Zang, Photochemical route for synthesizing atomically dispersed palladium catalysts, Science, 352 (2016) 797-800.
[12] L. Chen, S. Rangan, J. Li, H. Jiang, Y. Li, A molecular Pd (II) complex incorporated into a MOF as a highly active single-site heterogeneous catalyst for C—Cl bond activation, Green Chem., 16 (2014) 3978-3985.
[13] Z. Novotný, G. Argentero, Z. Wang, M. Schmid, U. Diebold, G. S. Parkinson, Ordered array of single adatoms with remarkable thermal stability: Au/Fe3O4 (001), Phys. Rev. Lett., 108 (2012) 216103.
[14] D. Skomski, C. D. Tempas, K. A. Smith, S. L. Tait, Redox-Active On-Surface Assembly of Metal-Organic Chains with Single-Site Pt(II), J. Am. Chem. Soc., 136 (2014) 9862-9865.
[15] B. Hu, A. B. Getsoian, N. M. Schweitzer, U. Das, H. Kim, J. Nildas, O. Poluektov, L. A. Curtiss, P. C. Stair, J. T. Miller, A. S. Hock, Selective propane dehydrogenation with single-site Co-II on SiO2 by a non-redox mechanism, J. Catal., 322 (2015) 24-37.
[16] A. Corma, O. G. Salnikov, D. A. Barskiy, K. V. Kovtunov, I. V. Koptyug, Single-Atom Gold Catalysis in the Context of Developments in Parahydrogen-Induced Polarization, Chem. Eur. J., 21 (2015) 7012-7015.
[17] H. Yan, H. Cheng, H. Yi, Y. Lin, T. Yao, C. Wang, J. Li, S. Wei, J. Lu, Single-atom Pd1/graphene catalyst achieved by atomic layer deposition: remarkable performance in selective hydrogenation of 1, 3-butadiene, J. Am. Chem. Soc., 137 (2015) 10484-10487.
[18] Q. Fu, H. Saltsburg, M. Flytzani-Stephanopoulos, Active nonmetallic Au and Pt species on ceria-based water-gas shift catalysts, Science, 301 (2003) 935-938.
[19] E. J. Peterson, A. T. DeLaRiva, S. Lin, R. S. Johnson, H. Guo, J. T. Miller, J. H. Kwak, C. H. Peden, B. Kiefer, L. F. Allard, Low-temperature carbon monoxide oxidation catalysed by regenerable atomically dispersed palladium on alumina, Nature Comm., 5 (2014) 4885.

[20] M. Moses-DeBusk, M. Yoon, L. F. Allard, D. R. Mullins, Z. Wu, X. Yang, G. Veith, G. M. Stocks, C. K. Narula, CO oxidation on supported single Pt atoms: Experimental and ab initio density functional studies of CO interaction with Pt atom on θ-Al2O3(010) surface, J. Am. Chem. Soc., 135 (2013) 12634-12645.

[21] J. Jones, H. Xiong, A. T. DeLaRiva, E. J. Peterson, H. Pham, S. R. Challa, G. Qi, S. Oh, M. H. Wiebenga, X. I. P. Hernandez, Thermally stable single-atom platinum-on-ceria catalysts via atom trapping, Science, 353 (2016) 150-154.

[22] G. Kyriakou, M. B. Boucher, A. D. Jewell, E. A. Lewis, T. J. Lawton, A. E. Baber, H. L. Tierney, M. Flytzani-Stephanopoulos, E. H. Sykes, Isolated metal atom geometries as a strategy for selective heterogeneous hydrogenations, Science, 335 (2012) 1209-1212.

[23] G. X. Pei, X. Y. Liu, X. Yang, L. Zhang, A. Wang, L. Li, H. Wang, X. Wang, T. Zhang, Performance of Cu-Alloyed Pd Single-Atom Catalyst for Semihydrogenation of Acetylene under Simulated Front-End Conditions, ACS Catal., 7 (2017) 1491-1500.

[24] J. Liu, F. R. Lucci, M. Yang, S. Lee, M. D. Marcinkowski, A. J. Therrien, C. T. Williams, E. C. H. Sykes, M. Flytzani-Stephanopoulos, Tackling CO Poisoning with Single-Atom Alloy Catalysts, J. Am. Chem. Soc., 138 (2016) 6396-6399.

[25] D. Ma, T. Li, Q. Wang, G. Yang, C. He, B. Ma, Z. Lu, Graphyne as a promising substrate for the noble-metal single-atom catalysts, Carbon, 95 (2015) 756-765.

[26] G. Vile, D. Albani, M. Nachtegaal, Z. Chen, D. Dontsova, M. Antonietti, N. Lopez, J. Perez-Ramirez, A Stable Single-Site Palladium Catalyst for Hydrogenations, Angew. Chem. Int. Ed., 54 (2015) 11265-11269.

[27] X. Li, W. Zhong, P. Cui, J. Li, J. Jiang, Design of efficient catalysts with double transition metal atoms on C2N layer, J. Phys. Chem. Lett., 7 (2016) 1750-1755.

[28] M. Joglekar, V. Nguyen, S. Pylypenko, C. Ngo, Q. Li, M. E. O'Reilly, T. S. Gray, W. A. Hubbard, T. B. Gunnoe, A. M. Herring, Organometallic complexes anchored to conductive carbon for electrocatalytic oxidation of methane at low temperature, J. Am. Chem. Soc., 138 (2015) 116-125.

[29] A. Liu, L. Yang, C.-H. Traulsen, J. Cornelissen, Immobilization of catalytic virus-like particles in a flow reactor, Chem. Comm., 53 (2017) 7632-7634.

[30] W. Xu, Y. Li, B. Yu, J. Yang, Y. Zhang, X. Chen, G. Zhang, Z. Gao, Ligand-tailored single-site silica supported titanium catalysts: Synthesis, characterization and towards cyanosilylation reaction, J. Solid State Chem., 221 (2015) 208-215.

[31] W. Xu, B. Yu, Y. Zhang, X. Chen, G. Zhang, Z. Gao, Single-site SBA-15 supported zirconium catalysts. Synthesis, characterization and toward cyanosilylation reaction, Appl. Surf. Sci., 325 (2015) 227-234.

[32] K. M. Mantovani, J. F. Stival, F. Wypych, L. Bach, P. G. P. Zamora, M. L. Rocco, S. Nakagaki, Unusual catalytic activity after simultaneous immobilization of two metalloporphyrins on hydrozincite/nanocrystalline anatase, J. Catal., 352 (2017) 442-451.

[33] S. Hubner, J. G. de Vries, V. Farina, Why Does Industry Not Use Immobilized Transition Metal Complexes as Catalysts?, Adv. Synth. Catal., 358 (2016) 3-25.

[34] C. by Design, Well-Defined Single-Site Heterogeneous Catalysts Pelletier, Jeremie D A; Basset, Jean-Marie, Acc. Chem. Res., 49 (2016) 664-677.

[35] P. Ji, K. Manna, Z. Lin, A. Urban, F. X. Greene, G. Lan, W. Lin, Single-Site Cobalt Catalysts at New Zr8 (µ2-O)8 (µ2-OH)4 Metal-Organic Framework Nodes for Highly Active Hydrogenation of Alkenes, Imines, Carbonyls, and Heterocycles, J. Am. Chem. Soc., 138 (2016) 12234-12242.

[36] R. C. Klet, S. Tussupbayev, J. Borycz, J. R. Gallagher, M. M. Stalzer, J. T. Miller, L. Gagliardi, J. T. Hupp, T. J. Marks, C. J. Cramer, Single-Site Organozirconium Catalyst Embedded in a Metal-Organic Framework, J. Am. Chem. Soc, 137 (2015) 15680-15683.

[37] J. Canivet, S. Aguado, Y. Schuurman, D. Farrusseng, MOF-supported selective ethylene dimerization single-site catalysts through one-pot postsynthetic modification, J. Am. Chem. Soc., 135 (2013) 4195-4198.

[38] B. Hu, N. M. Schweitzer, G. Zhang, S. J. Kraft, D. J. Childers, M. P. Lanci, J. T. Miller, A. S. Hock, Isolated FeII on Silica As a Selective Propane Dehydrogenation Catalyst, ACS Catal., 5 (2015) 3494-3503.

[39] N.M. Schweitzer, B. Hu, U. Das, H. Kim, J. Greeley, L. A. Curtiss, P.C. Stair, J. T. Miller, A. S. Hock, Propylene Hydrogenation and Propane Dehydrogenation by a Single-Site Zn2+ on Silica Catalyst, ACS Catal., 4 (2014) 1091-1098.

[40] H. Sohn, J. Camacho-Bunquin, R. Langeslay, P. Ignacio-de Leon, J. Niklas, O. Poluektov, C. Liu, J. Connell, D. Yang, J. Kropf, Isolated, well-defined organovanadium (III) on silica: single-site catalyst for hydrogenation of alkenes and alkynes, Chem. Comm., (2017).

[41] L. Dong, Z. A. Gao, N. Lin, Self-assembly of metal-organic coordination structures on surfaces, Prog. Surf. Sci., 91 (2016) 101-135.

[42] F. Klappenberger, A. Weber-Bargioni, W. Auwaerter, M. Marschall, A. Schiffrin, J. V. Barth, Temperature dependence of conformation, chemical state, and metal-directed assembly of tetrapyridyl-porphyrin on Cu(111), J. Chem. Phys., 129 (2008).

[43] J. Boscoboinik, J. Kestell, M. Garvey, M. Weinert, W. T. Tysoe, Creation of Low-Coordination Gold Sites on Au(111) Surface by 1,4-phenylene Diisocyanide Adsorption, Top. Catal., 54 (2011) 20-25.

[44] D. Skomski, C.D. Tempas, G. S. Bukowski, K. A. Smith, S. L. Tait, Redox-active on-surface polymerization of single-site divalent cations from pure metals by a ketone-functionalized phenanthroline, J. Chem. Phys., 142 (2015) 101913.

[45] D. Skomski, C.D. Tempas, B. J. Cook, A. V. Polezhaev, K. A. Smith, K. G. Caulton, S. L. Tait, Two- and Three-Electron Oxidation of Single-Site Vanadium Centers at Surfaces by Ligand Design, J. Am. Chem. Soc., 137 (2015) 7898-7902.

[46] J. V. Barth, Fresh perspectives for surface coordination chemistry, Surf. Sci., 603 (2009) 1533-1541.

[47] M. A. Lingenfelder, H. Spillmann, A. Dmitriev, S. Stepanow, N. Lin, J. V. Barth, K. Kern, Towards surface-supported supramolecular architectures: tailored coordination assembly of 1,4-benzenedicarboxylate and Fe on Cu(100), Chem. Eur. J., 10 (2004) 1913-1919.

[48] R. Gutzler, S. Stepanow, D. Grumelli, M. Lingenfelder, K. Kern, Mimicking Enzymatic Active Sites on Surfaces for Energy Conversion Chemistry, Acc. Chem. Res., 48 (2015) 2132-2139.

[49] C.D. Tempas, T. Morris, D. L. Wisman, D. Le, N. U. Din, C. G. Williams, M. Wang, A. V. Polezhaev, T. S. Rahman, K. G. Caulton, S. L. Tait, Redox-active ligand controlled selectivity of vanadium oxidation on Au(100), Chem. Sci., 9 (2018) 1674-1685.

[50] S. Fabris, S. Stepanow, N. Lin, P. Gambardella, A. Dmitriev, J. Honolka, S. Baroni, K. Kern, Oxygen Dissociation by Concerted Action of Di-Iron Centers in Metal-Organic Coordination Networks at Surfaces: Modeling Non-Heme Iron Enzymes, Nano Lett., 11 (2011) 5414-5420.

[51] Z. Paal, A. Gyory, I. Uszkurat, S. Olivier, M. Guerin, C. Kappenstein, Pt/Al$_2$O$_3$ catalysts and Pt—Sn/Al$_2$O$_3$ catalysts prepared by two different methods: Hydrogen pressure effects in the reactions of n-hexane, J. Catal., 168 (1997) 164-175.

[52] A. Dolev, G. E. Shter, G. S. Grader, Synthesis and structural characterization of Pt/amorphous Al$_2$O$_3$ catalyst, J. Catal., 214 (2003) 146-152.

[53] D. Svoronos, H. Grigoropoulou, C. Philippopoulos, Effect of Pt/Al$_2$O$_3$ catalyst preparation conditions upon its activity in nitric oxide reduction, Appl. Catal., B, 5 (1995) 319-328.

[54] N. An, X. Yuan, B. Pan, Q. Li, S. Li, W. Zhang, Design of a highly active Pt/Al$_2$O$_3$ catalyst for low-temperature CO oxidation, RSC Adv., 4 (2014) 38250-38257.

[55] G. Jacobs, L. Williams, U. Graham, D. Sparks, B. H. Davis, Low-Temperature Water-Gas Shift: In-Situ DRIFTS-Reaction Study of a Pt/CeO$_2$ Catalyst for Fuel Cell Reformer Applications, J. Phys. Chem. B, 107 (2003) 10398-10404.

[56] V. P. Pakharukova, I. Y. Pakharukov, V. I. Bukhtiyarov, V. N. Parmon, Alumina-supported platinum catalysts: Local atomic structure and catalytic activity for complete methane oxidation, Appl. Catal., A, 486 (2014) 12-18.

[57] I. E. Beck, V. I. Bukhtiyarov, I. Y. Pakharukov, V. I. Zaikovsky, V. V. Kriventsov, V. N. Parmon, Platinum nanoparticles on Al$_2$O$_3$: Correlation between the particle size and activity in total methane oxidation, J. Catal., 268 (2009) 60-67.

[58] J. E. Benson, M. Boudart, Hydrogen-oxygen titration method for the measurement of supported platinum surface areas, J. Catal., 4 (1965) 704-710.

[59] D. Mears, R. Hansford, The stoichiometry for hydrogen titration of oxygen on supported platinum, J. Catal., 9 (1967) 125-134.

[60] J. Prasad, K. Murthy, P. Menon, The stoichiometry of hydrogen-oxygen titrations on supported platinum catalysts, J. Catal., 52 (1978) 515-520.

[61] B. Ravel, M. Newville, ATHENA, ARTEMIS, HEPHAESTUS: data analysis for X-ray absorption spectroscopy using IFEFFIT, J. Synchrotron Radiat., 12 (2005) 537-541.

[62] M. Newville, EXAFS analysis using FEFF and FEFFIT, J. Synchrotron Radiat., 8 (2001) 96-100.

[63] M. Newville, IFEFFIT: interactive XAFS analysis and FEFF fitting, J. Synchrotron Radiat., 8 (2001) 322-324.

[64] W. P. Davey, Precision measurements of the lattice constants of twelve common metals, Phys. Rev., 25 (1925) 753.

[65] K. Sakai, Y. Yokoyama, K. Okamoto, S. Takahashi, (4-Amino-2, 2'-bipyridine) dichloroplatinum (II) dihydrate, Acta Crystallogr. E, 59 (2003) m518-m520.

[66] R. Faggiani, B. Lippert, C. Lock, B. Rosenberg, Hydroxo-bridged platinum (II) complexes. 1. Di-. mu.-hydroxo-bis [diammineplatinum (II)] nitrate, [(NH3)2Pt(OH)2PONH3)2](NO3)2. Crystalline structure and vibrational spectra, J. Am. Chem. Soc., 99 (1977) 777-781.

[67] H. R. Hoekstra, S. Siegel, F. X. Gallagher, Reaction of platinum dioxide with some metal oxides, in, ACS Publications, 1971.

[68] J. L. Speier, J. A. Webster, G. H. Barnes, The addition of silicon hydrides to olefinic double bonds. Part II. The use of group VIII metal catalysts, J. Am. Chem. Soc., 79 (1957) 974-979.

[69] J. L. Speier, Homogeneous catalysis of hydrosilation by transition metals, in: Advances in Organometallic Chemistry, Elsevier, 1979, pp. 407-447.

[70] K. Asakura, H. Nagahiro, N. Ichikuni, Y. Iwasawa, Structure and catalytic combustion activity of atomically dispersed Pt species at MgO surface, Appl. Catal., A, 188 (1999) 313-324.

[71] J. Clarke, M. Bradley, L. Garvie, A. Craven, T. Baird, Pt/MgO as Catalyst for Hydrogenolysis Reactions of C 5 and C 6 Hydrocarbons: Evidence for Metal-Support Interactions, J. Catal., 143 (1993) 122-137.

[72] T. Tanabe, Y. Nagai, K. Dohmae, H. Sobukawa, H. Shinjoh, Sintering and redispersion behavior of Pt on Pt/MgO, J. Catal., 257 (2008) 117-124.

[73] Y. Yazawa, N. Takagi, H. Yoshida, S.-i. Komai, A. Satsuma, T. Tanaka, S. Yoshida, T. Hattori, The support effect on propane combustion over platinum catalyst: control of the oxidation-resistance of platinum by the acid strength of support materials, Appl. Catal., A, 233 (2002) 103-112.

[74] H. C. Choi, S. H. Choi, O. B. Yang, J. S. Lee, K. H. Lee, Y. G. Kim, Hydrodechlorination of carbon tetrachloride over Pt/MgO, J. Catal., 161 (1996) 790-797.

[75] D. Le, T. S. Rahman, Pt-Dipyridyl Tetrazine metal-organic network on the Au (100) surface: Insights from first principles calculations, Faraday Discuss., (2017).

[76] M. Kosmulski, Attempt to determine pristine points of zero charge of Nb2O5, Ta2O5, and HfO2, Langmuir, 13 (1997) 6315-6320.

[77] C. Morterra, S. Coluccia, A. Chiorino, F. Boccuzzi, Infrared study of the adsorption of pyridine on α-Al$_2$O$_3$, J. Catal., 54 (1978) 348-364.

[78] M. W. Urban, J. L. Koenig, Determination of the orientation of adsorbed pyridine and γ-MPS on alumina surface by photoacoustic FT-IR spectroscopy, Appl. Spectrosc., 40 (1986) 851-856.

[79] M. I. Zaki, M. A. Hasan, F. A. Al-Sagheer, L. Pasupulety, In situ FTIR spectra of pyridine adsorbed on SiO2-Al$_2$O$_3$, TiO2, ZrO2 and CeO$_2$: general considerations for the identification of acid sites on surfaces of finely divided metal oxides, Colloids Surf., A, 190 (2001) 261-274.

[80] J. A. Lercher, Acid-Base Properties of Al$_2$O$_3$/MgO Oxides, Z. Phys. Chem., 129 (1982) 209-218.

[81] C. Anandan, P. Bera, Growth, characterization and interfacial reaction of magnetron sputtered Pt/CeO$_2$ thin films on Si and Si3N4 substrates, Surf. Interface Anal., 47 (2015) 777-784.

[82] D. Teschner, A. Wootsch, O. Pozdnyakova, H. Sauer, A. Knop-Gericke, R. Schlogl, Surface and structural properties of Pt/CeO$_2$ catalyst under preferential CO oxidation in hydrogen (PROX), React. Kinet. Catal. Lett., 87 (2006) 235-247.

[83] P. Bera, K. Priolkar, A. Gayen, P. Sarode, M. Hegde, S. Emura, R. Kumashiro, V. Jayaram, G. Subbanna, Ionic dispersion of Pt over CeO$_2$ by the combustion method: Structural investigation by XRD, TEM, XPS, and EXAFS, Chem. Mater., 15 (2003) 2049-2060.

[84] P. Bera, A. Gayen, M. Hegde, N. Lalla, L. Spadaro, F. Frusteri, F. Arena, Promoting effect of CeO2 in combustion synthesized Pt/CeO2 catalyst for CO oxidation, J. Phys. Chem. B, 107 (2003) 6122-6130.

[85] S. S. Kim, H. H. Lee, S. C. Hong, A study on the effect of support's reducibility on the reverse water-gas shift reaction over Pt catalysts, Appl. Catal., A, 423 (2012) 100-107.

[86] A. Datye, D. Kalakkad, M. Yao, D. J. Smith, Comparison of metal-support interactions in Pt/TiO2 and Pt/CeO2, J. Catal., 155 (1995) 148-153.

[87] B. Karstedt, Platinum complexes of unsaturated siloxanes and platinum containing organopolysiloxanes, in, Google Patents, 1973.

[88] I. E. Marko, S. Sterin, O. Buisine, G. Berthon, G. Michaud, B. Tinant, J. P. Declercq, Highly Active and Selective Platinum (0)-Carbene Complexes. Efficient, Catalytic Hydrosilylation of Functionalised Olefins, Adv. Synth. Catal., 346 (2004) 1429-1434.

[89] I. E. Markó, S. Stérin, O. Buisine, G. Mignani, P. Branlard, B. Tinant, J.-P. Declercq, Selective and efficient platinum (0)-carbene complexes as hydrosilylation catalysts, Science, 298 (2002) 204-206.

[90] B. Marciniec, Hydrosilylation: a comprehensive review on recent advances, Springer Science & Business Media, 2008.

[91] J. Stein, L. Lewis, Y. Gao, R. Scott, In situ determination of the active catalyst in hydrosilylation reactions using highly reactive Pt (0) catalyst precursors, J. Am. Chem. Soc., 121 (1999) 3693-3703.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A single site catalyst system comprising: (a) a single site catalyst precursor compound and (b) a support, wherein the single site catalyst precursor comprises the formula:

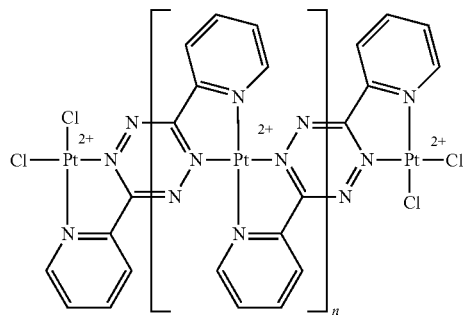

wherein n is 2 to 5.

2. The single site catalyst system of claim 1, wherein the support comprises MgO, Al$_2$O$_3$, CeO$_2$ and mixtures thereof.

3. The single site catalyst of claim 1, wherein the support is powdered.

4. The single site catalyst of claim 3, wherein the support comprises CeO$_2$.

* * * * *